(12) United States Patent
Ippatapu

(10) Patent No.: US 10,572,172 B2
(45) Date of Patent: Feb. 25, 2020

(54) MULTI-GRANULAR DATA REDUCTION FOR REMOTE DATA REPLICATION

(71) Applicant: EMC IP Holding Company LLC, Hopkinton, MA (US)

(72) Inventor: Venkata L R Ippatapu, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 68 days.

(21) Appl. No.: 15/958,556

(22) Filed: Apr. 20, 2018

(65) Prior Publication Data

US 2019/0324674 A1  Oct. 24, 2019

(51) Int. Cl.
G06F 3/06  (2006.01)

(52) U.S. Cl.
CPC ............ G06F 3/0641 (2013.01); G06F 3/065 (2013.01); G06F 3/0608 (2013.01); G06F 3/0613 (2013.01)

(58) Field of Classification Search
CPC .................................................... G06F 3/0641
See application file for complete search history.

(56) References Cited

U.S. PATENT DOCUMENTS

| | | | |
|---|---|---|---|
| 5,544,347 A | 8/1996 | Yanai et al. | |
| 5,742,792 A | 4/1998 | Yanai et al. | |
| 6,968,369 B2 | 11/2005 | Veprinsky et al. | |
| 7,054,883 B2 | 5/2006 | Meiri et al. | |
| 8,082,231 B1 | 12/2011 | McDaniel et al. | |
| 9,116,858 B1 * | 8/2015 | Yokoi | G06F 15/17331 |
| 9,436,723 B2 | 9/2016 | Lumb | |
| 9,558,200 B2 | 1/2017 | Chamness | |
| 9,665,305 B1 | 5/2017 | Natanzon et al. | |
| 10,037,336 B1 | 7/2018 | Hu et al. | |
| 10,127,235 B2 | 11/2018 | Rao et al. | |

(Continued)

OTHER PUBLICATIONS

P.F. Windley, et al., "Binary search tree," Retrieved from https://en.wikipedia.org/w/index.php?title=Binary_search_tree&oldid=801134990, Sep. 17, 2017.

(Continued)

*Primary Examiner* — Ryan Bertram
*Assistant Examiner* — Edmund H Kwong
(74) *Attorney, Agent, or Firm* — Muirhead and Saturnelli, LLC

(57) ABSTRACT

Multi-granular deduplication is performed on I/O data received at a storage system as part of replicating the I/O data to another storage system. Deduplication may be performed in an iterative fashion, for example, on blocks and smaller and smaller sub-blocks of the I/O data. Deduplication may be performed on blocks and smaller sub-blocks by comparing each block or sub-block to preceding blocks or sub-blocks, respectively, in the I/O data to determine if there is a duplicate. If a duplicate block of sub-block is determined for a block or sub-block, the block or sub-block may be replaced in the I/O data with a reference to the duplicate block or sub-block in a deduplication header for the block. A metadata structure may indicate which blocks of the I/O data have had deduplication performed thereon. The replicating storage system may use the metadata structure and deduplication block headers to restore the I/O data.

20 Claims, 17 Drawing Sheets

(56) References Cited

U.S. PATENT DOCUMENTS

2013/0212074 A1* 8/2013 Romanski ........... G06F 12/0253
707/692
2017/0199820 A1 7/2017 Romanovskiy

OTHER PUBLICATIONS

Venkata L. R. Ippatapu, et al., U.S. Appl. No. 15/728,758, filed Oct. 10, 2017, "Host Data Replication Using Deduplication and Binary Search Trees".
Venkata L. R. Ippatapu, et al., U.S. Appl. No. 15/879,813, filed Jan. 25, 2018, "Data Replication Using Deduplication and Synchronized Hash Tables".
U.S. Appl. No. 16/113,477, filed Aug. 27, 2018, Ippatapu.

* cited by examiner

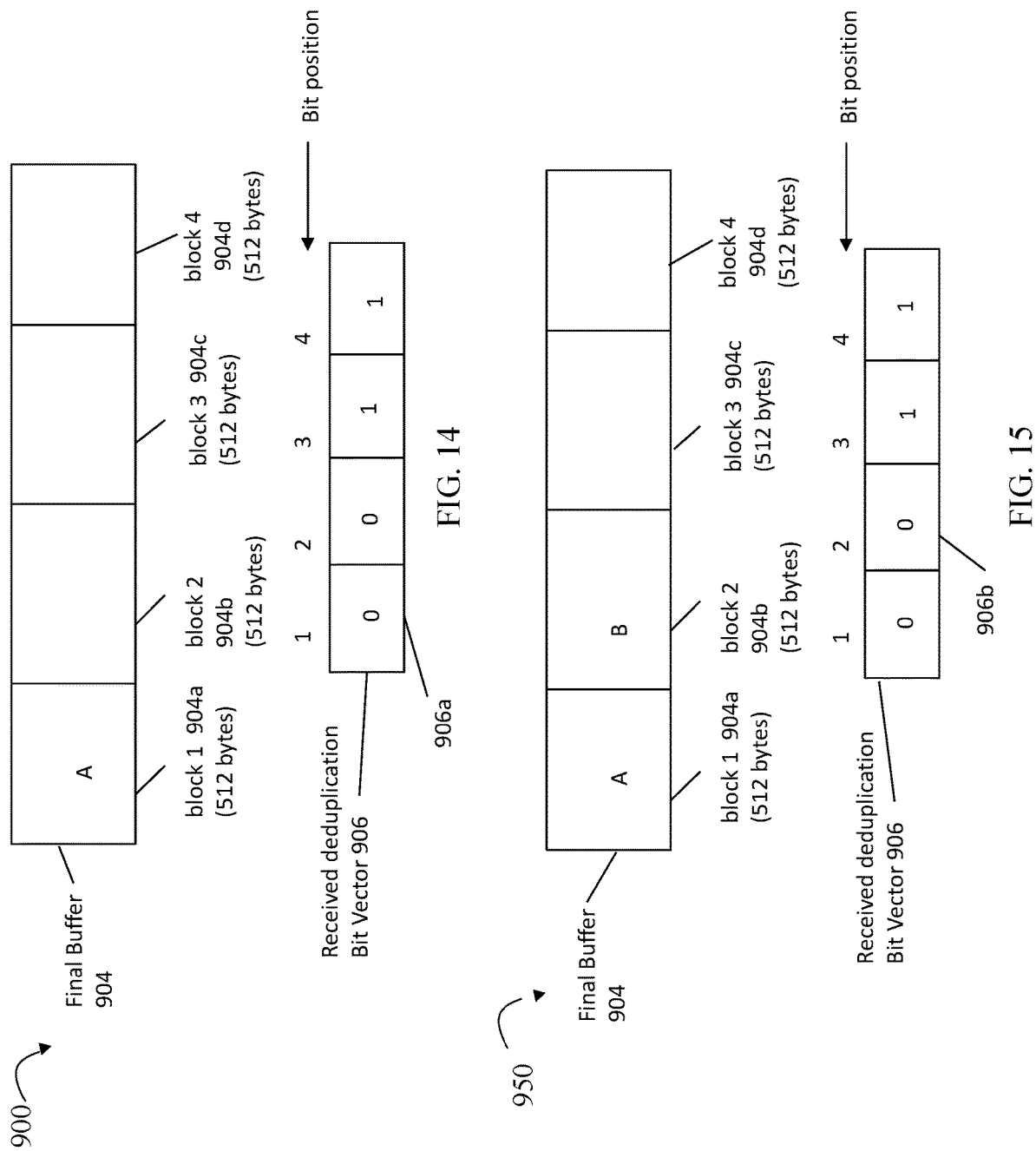

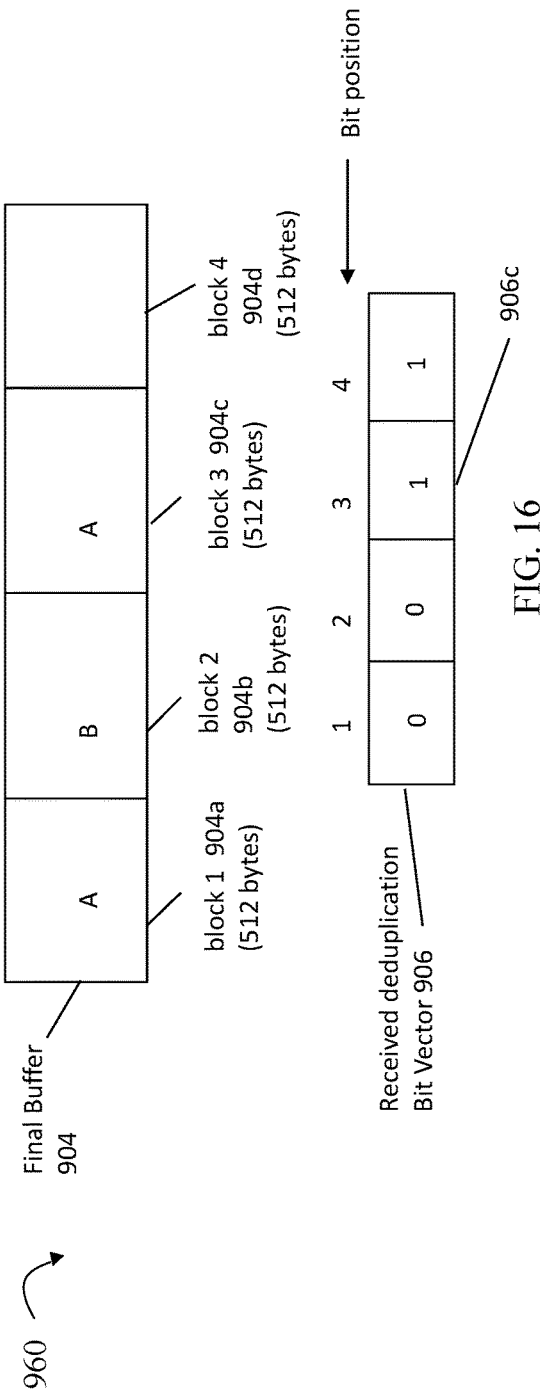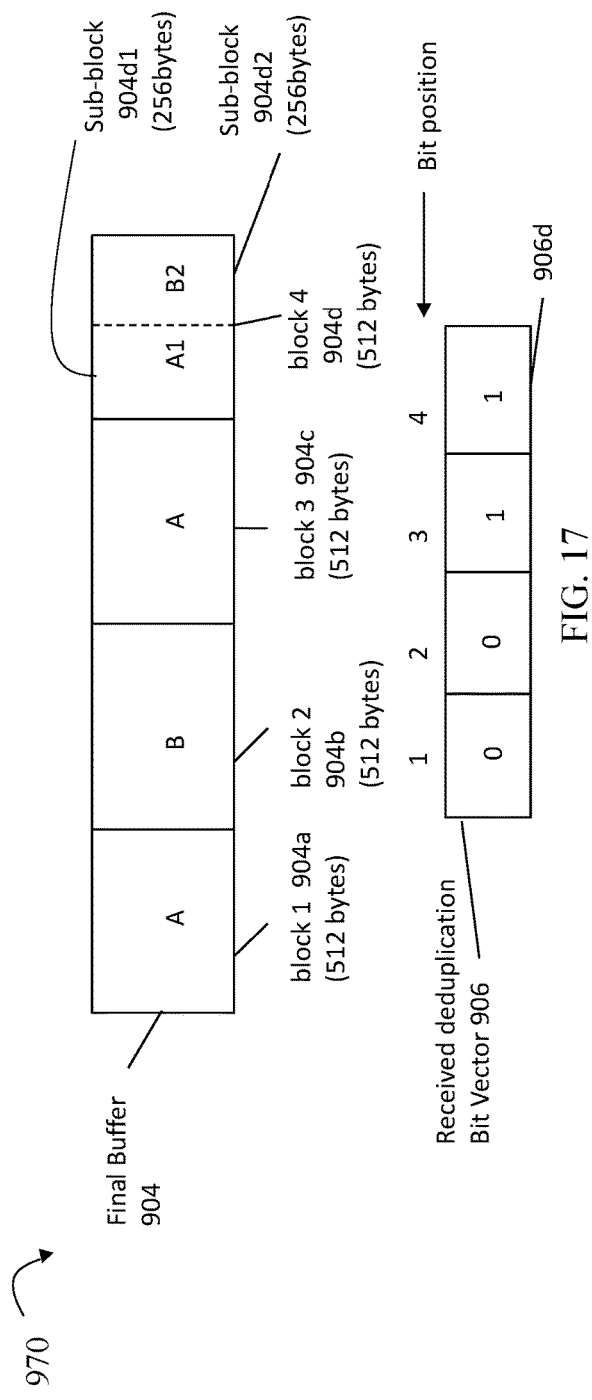

MULTI-GRANULAR DATA REDUCTION FOR REMOTE DATA REPLICATION

BACKGROUND

Technical Field

This application generally relates to data storage and more particularly to techniques used in connection with data deduplication and data replication.

Description of Related Art

Computer systems may include different resources used by one or more host processors. Resources and host processors in a computer system may be interconnected by one or more communication connections. These resources may include, for example, data storage devices such as those included in the data storage systems manufactured by Dell EMC. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. For example, in some implementations, a primary or source data site, such as a first or primary data storage system, may be configured in a partner relationship with a second or remote data storage system whereby the second data storage system includes a mirror or copy of data of one or more devices of the first data storage system. Such mirroring may be used for a variety of reasons including reducing the likelihood of data loss. Mirroring is a form of replication, in which data on the first storage device is replicated on the second storage device.

The time it takes to perform data replication depends in part on the time it takes to transmit the data being replicated between the primary and secondary storage devices, and the time it takes to transmit the data being replicated depends in part on the size of the data. Thus, it may be desirable to reduce the size of the data being replicated (without losing any data) to reduce data replication times.

SUMMARY OF THE INVENTION

In some embodiments of the invention, a method of processing I/O data including a plurality of blocks of data is performed, the method including determining that at least a first block of the plurality of blocks is not a duplicate of any other block of the plurality of blocks, dividing the at least first block into a plurality of sub-blocks, determining that at a first sub-block of the plurality of sub-blocks is a duplicate of a second sub-block of the plurality of sub-blocks; and replacing the at least first sub-block with a reference to the second sub-block to produce deduplicated I/O data. The method may include determining that at least a second block of the plurality of blocks is a duplicate of a third block of the plurality of blocks, and replacing the at least second block with a reference to the third block. The method may include determining that at least a second block of the plurality of blocks is a duplicate of a third block of the plurality of blocks, and refraining from dividing the at least second block into a plurality of sub-blocks or determining whether any sub-blocks of the plurality of sub-blocks is a duplicate of any other sub-block of the plurality of sub-blocks. Determining that the at least first block of the plurality of blocks is not a duplicate may include determining that two or more of the plurality of blocks is not a duplicate of any other block of the plurality of blocks, where the method may include dividing the at least first block into the plurality of sub-blocks includes dividing the two or more blocks into the plurality of sub-blocks. The method may include creating a first data structure corresponding to the I/O data, the first data structure having a number of fields, each field representing a respective one of the blocks of the I/O data and indicating whether the respective block or any sub-block thereof has been replaced with a reference to a duplicate block or duplicate sub-block, respectively. The I/O data may be part of an I/O request received at a first storage system, where the method may include replicating the I/O data to a second storage system, including transmitting the deduplicated I/O data to the second storage system, and, at the second storage system, restoring the I/O data from the deduplicated I/O data using the first data structure and one or more references to duplicate blocks and/or duplicate sub-blocks in the deduplicated I/O data. The I/O data may be part of an I/O request received at a first storage system, where the method further includes replicating the I/O data to a second storage system, including transmitting the deduplicated I/O data to the second storage system. The method may include compressing the deduplicated I/O data prior to transmitting the deduplicated I/O data to the second storage system such that transmitting the deduplicated I/O data includes transmitting the compressed deduplicated I/O data. The method may include creating the reference to the second sub-block, wherein the reference includes an indication of a position of the second sub-block within the I/O data. The method may include creating the reference to the second sub-block, wherein the reference includes a count of a number of sub-blocks within the first sub-block for which a duplicate sub-block within the I/O data is determined.

Is some embodiments of the invention, a data storage system in which I/O data received from a host is comprised of a plurality of blocks of data is provided, the data storage system including one or more processors and a memory including code stored thereon that, when executed, performs a method including: determining that at least a first block of the plurality of blocks is not a duplicate of any other block of the plurality of blocks, dividing the at least first block into a plurality of sub-blocks, determining that at a first sub-block of the plurality of sub-blocks is a duplicate of a second sub-block of the plurality of sub-blocks, and replacing the at least first sub-block in the I/O data with a reference to the second sub-block to produce deduplicated I/O data. The method may include determining that at least a second block of the plurality of blocks is a duplicate of a third block of the plurality of blocks and replacing the at least second block with a reference to the third block. The method may include determining that at least a second block of the plurality of blocks is a duplicate of a third block of the plurality of blocks, and refraining from dividing the at least second block into a plurality of sub-blocks or determining whether any sub-blocks of the plurality of sub-blocks is a duplicate of any other sub-block of the plurality of sub-blocks. The method may include creating a first data structure corresponding to the I/O data, the first data structure having a number of fields, each field representing a respective one of the blocks of the I/O data and indicating whether the respective block or any sub-block thereof has been replaced with a reference to a duplicate block or duplicate sub-block, respectively. The I/O data may be part of an I/O request received at a first storage system, where the method include replicating the I/O data to a second storage system, including transmitting the deduplicated I/O data to the second storage system, and, at the second storage system, restoring the I/O data from the deduplicated I/O data using the first data structure and one or more references to duplicate blocks and/or duplicate sub-blocks in the deduplicated I/O data.

In some embodiments, a non-transitory computer-readable medium having software stored thereon for a data storage system is provided in which I/O data received from a host is included of a plurality of blocks of data. The software includes: executable code that determines that at least a first block of the plurality of blocks is not a duplicate of any other block of the plurality of blocks, executable code that divides the at least first block into a plurality of sub-blocks, executable code that determines that at a first sub-block of the plurality of sub-blocks is a duplicate of a second sub-block of the plurality of sub-blocks, and executable code that replaces the at least first sub-block in the I/O data with a reference to the second sub-block to produce deduplicated I/O data. The software may include executable code that determines that at least a second block of the plurality of blocks is a duplicate of a third block of the plurality of blocks, and executable code that replaces the at least second block with a reference to the third block. The software may include executable code that determines that at least a second block of the plurality of blocks is a duplicate of a third block of the plurality of blocks and executable code that refrains from dividing the at least second block into a plurality of sub-blocks or determining whether any sub-blocks of the plurality of sub-blocks is a duplicate of any other sub-block of the plurality of sub-blocks. The software may include executable code that creates a first data structure corresponding to the I/O data, the first data structure having a number of fields, each field representing a respective one of the blocks of the I/O data and indicating whether the respective block or any sub-block thereof has been replaced with a reference to a duplicate block or duplicate sub-block, respectively. The I/O data may be part of an I/O request received at a first storage system, where the software further includes executable code that replicates the I/O data to a second storage system, including transmitting the deduplicated I/O data to the second storage system such that, at the second storage system, the I/O data is restored from the deduplicated I/O data using the first data structure and one or more references to duplicate blocks and/or duplicate sub-blocks in the deduplicated I/O data.

BRIEF DESCRIPTION OF THE DRAWINGS

Features and advantages of the present invention will become more apparent from the following detailed description of exemplary embodiments thereof taken in conjunction with the accompanying drawings in which:

FIGS. 14-17 illustrate examples of restoring original I/O data from data-reduced I/O data according to at least one embodiment of the invention.

DETAILED DESCRIPTION OF EMBODIMENT(S)

Figure 1:
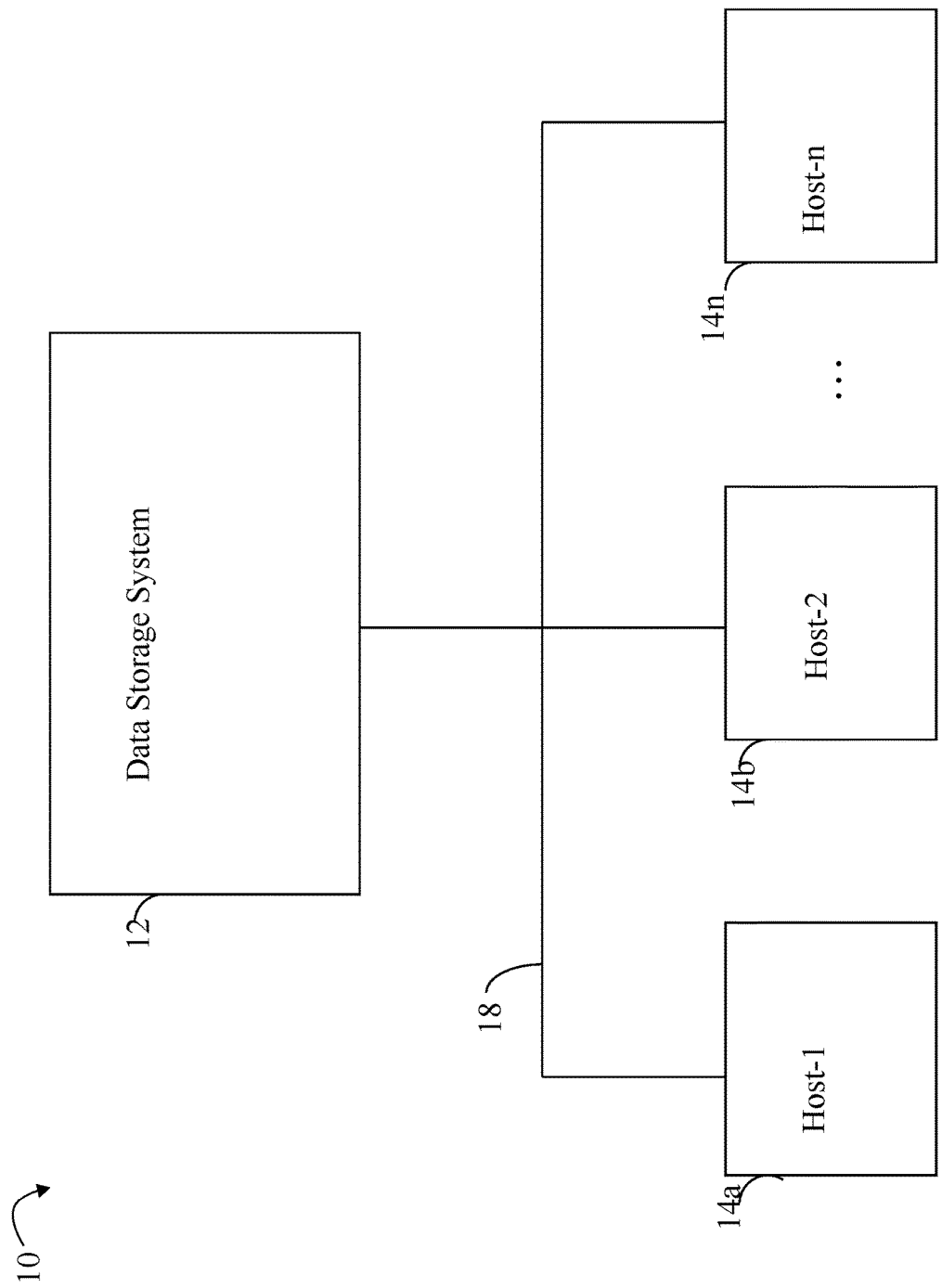
FIG. 1 is an example of an embodiment of a computer system, according to at least one embodiment of the invention.

Described herein is a system and techniques for performing multi-granular data reduction, including deduplication, on I/O data received from a host at a storage system, for example, as part of replicating the I/O data to another storage system. Deduplication may be performed in an iterative fashion, for example, on smaller and smaller blocks (e.g., sub-blocks) of the I/O data. For example, the I/O data may be divided into blocks of a predetermined size (e.g., 512 bytes). The blocks may be ordered, for example, in an order corresponding to the order of the bits of the I/O data grouped into the blocks. Deduplication is performed on the blocks by comparing each block to the preceding blocks (per the defined order) in the I/O data to determine if there is a match. These comparisons may involve calculating (if one is not already provided with the I/O data) and/or comparing fingerprints, for example, CRC values, of each block. If a duplicate block (i.e., a "match") is determined for a block, the block may be replaced in the I/O data with a reference to the duplicate block, the reference being relative to the position of the duplicate block within the I/O data. This reference may be part of a deduplication block header generated for the block. A deduplication block header may be generated for each block for which any deduplication is performed (e.g., at any deduplication level as described herein) and possibly updated (e.g., for different deduplication levels). The deduplication performed on the highest-level blocks may be referred to herein as a first level of deduplication. Deduplication may be performed at one or more additional lower levels on sub-blocks of the highest-level blocks If there are any blocks for which a duplicate was not determined at a particular level, such blocks are further divided into sub-blocks of a predefined size (e.g., 256 bytes), and, for any such blocks for which a duplicate was not determined, it is determined whether the sub-blocks of the block are duplicates of any of the other sub-blocks by comparing each sub-block to the preceding sub-blocks in the I/O data to determine if there is a match. This comparison may involve calculating and comparing fingerprints of each sub-block. If a duplicate sub-block is determined for a sub-block, the sub-block may be replaced in the I/O data with a reference to the duplicate block, i.e., in the deduplication block header of the highest-level block of which the duplicate block is a sub-block, the reference being relative to the position of the duplicate sub-block within the I/O data. The deduplication on the sub-blocks of the blocks described above, including dividing into sub-blocks, determining duplicates within the sub-blocks, and replacing duplicate sub-blocks with references to the duplicated sub-blocks, may be referred to herein as a second level of deduplication. The process of dividing into sub-blocks, determining duplicates within the sub-blocks, and replacing duplicate sub-blocks with references may be performed on any sub-blocks of blocks for which a duplicate sub-block was not repeated, and this may be referred to as a third level of deduplication, and such process may be repeated again on smaller (e.g., 128 bytes) and smaller (e.g., 64 bytes) sub-blocks at a fourth level, fifth level, etc. of deduplication. The number of levels of deduplication may be predefined. The resulting I/O data after deduplication has been performed at all levels may be referred to herein as deduplicated I/O data.

In some embodiments, the deduplicated I/O data may be compressed and the compressed deduplicated I/O data transmitted to a second (e.g., remote) storage system as part or replicating the I/O data. Reduced I/O data is I/O data that has at least been deduplicated, and for which the deduplicated I/O data may have been compressed. In some embodiments, in addition to maintaining a deduplication block header for each block, a deduplication metadata header may be maintained for the I/O data. The deduplication metadata header may include one bit for each block of data in the I/O data, or one bit for each block of a maximum potential number of blocks in I/O data. For example, in some embodiments of the invention, I/O data may be predefined to have a maximum potential size of 128 KB and the block size may be predefined to be 512 blocks. In such embodiments, the deduplication metadata header may be configured to have (128*1024)/512=256 bits. During deduplication, a bit representing a given highest-level block of I/O data may be set to 1 if deduplication is performed on the highest-level block or any sub-block of the block, and may be set to "0" if there are no blocks in the I/O data corresponding to the position of the deduplication metadata header bit. Alternatively, all bits may be set to default to "0", and at "0" if no deduplication is performed on the highest-level block or any of its sub-blocks. For example, in embodiments in which the maximum I/O data size is 128 KB and the block size is predefined to be 512 blocks, if the I/O data received from a host is only 10 KB in size, then only the least significant 20 bits of the deduplication metadata header may represent actual blocks of the I/O data, and the remaining 236 bits may be set to "0".

The deduplication metadata header may be transmitted along with the reduced I/O data to a second storage device as part of replicating the I/O data. An indication of the original size of the I/O data before being reduced (i.e., by deduplication, and compression if any) may be transmitted along with the reduced I/O data to the second storage device as well. For example, the original size information and/or deduplication metadata header may be included as part of a replication header (e.g., a Common Driver Interface (CDI) header on a Symmetrix system) transmitted with the reduced I/O data to the replicating storage device. The replicating storage device may restore the original I/O data from the reduced I/O data. This restoring may involve determining the original I/O size from the original size information, and then using the deduplication metadata header and deduplication block header as described in more detail below to determine and restore duplicate blocks (e.g., highest-level blocks or sub-blocks), and placing the I/O data in a buffer. The replicating storage system then may perform other operations on the restored I/O data.

By performing multiple levels of deduplication at multiple levels of granularity on I/O data, there is a greater likelihood that duplicates will be found, and thus the I/O data reduced, which will result in less data being transmitted to a replicating storage system. Less data being transmitted should result in faster replication times and a reduction in overall network bandwidth consumption. Compressing the deduplicated I/O data will further reduce the I/O data size, resulting in even faster storage times and less network bandwidth consumption.

Examples of embodiments of the invention will now be described in more detail with reference to the drawings. Some of the embodiments described herein use an example of a maximum potential I/O size of 128 KB, a maximum block size of 512 blocks and four levels of deduplication at block sizes of 512, 256, 128 and 64 bytes. It should be appreciated that these examples are for illustrative purposes and the invention is not so limited, as different maximum potential I/O sizes, block and sub-block sizes, and numbers of deduplication levels may be used and fall within the scope of the invention.

FIG. 1 is an example of an embodiment of a computer system 10, according to at least one embodiment of the invention. Other embodiments of a computer system, for example, variations of system 10, are possible and are intended to fall within the scope of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
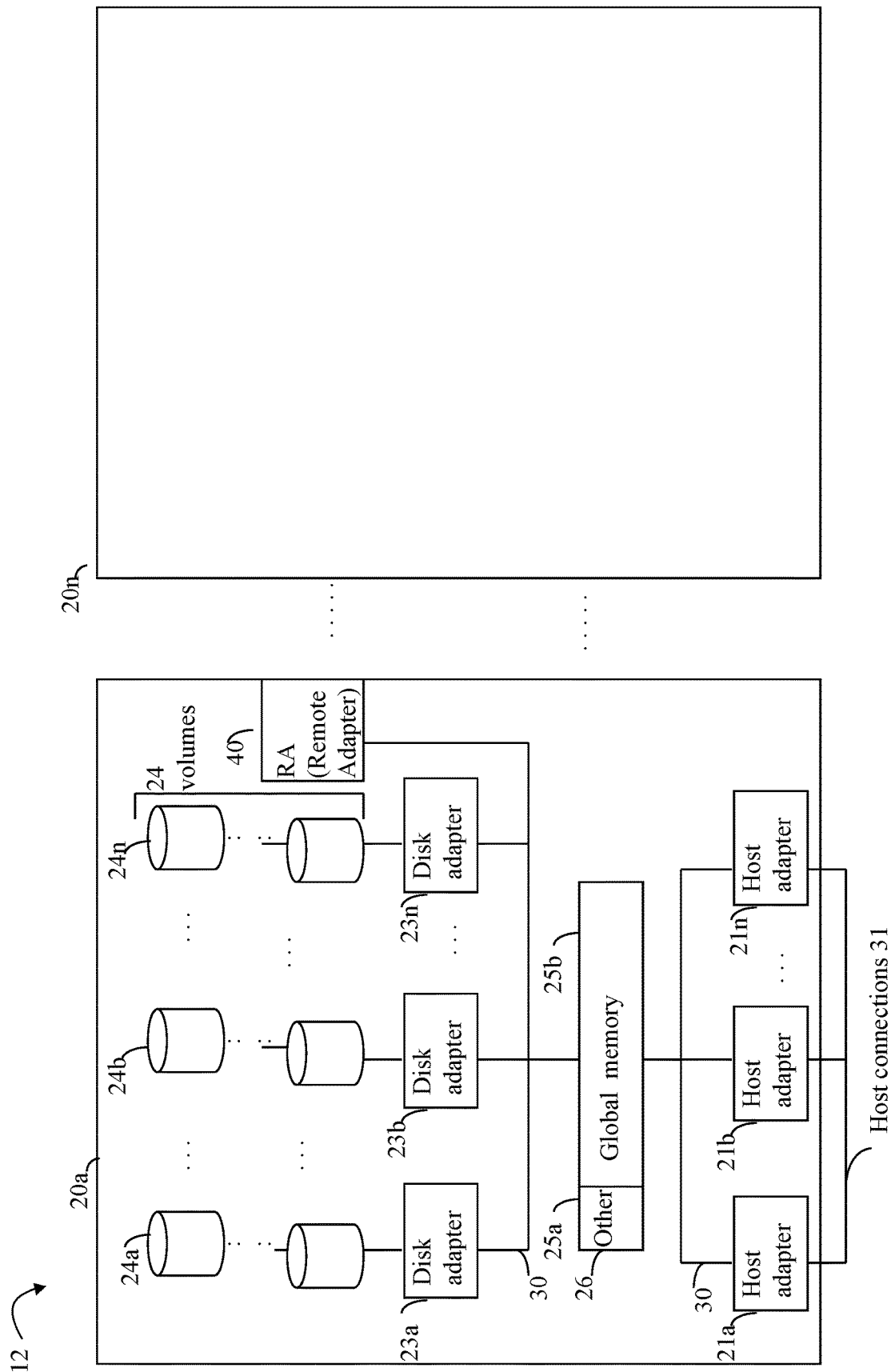
FIG. 2A is an example of a data storage system, according to at least one embodiment of the invention.

FIG. 2A is an example of a data storage system 12, according to at least one embodiment of the invention, which may be included in the system 10 of FIG. 1. Other embodiments of a data storage system, for example, variations of data storage system 12, are possible and are intended to fall within the scope of the invention. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices (e.g., physical non-volatile storage devices), such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by Dell Inc. SRDF is a family of products that facilitates the data replication from one Symmetrix® storage array to another through a Storage Area Network (SAN) or and IP network. SRDF logically pairs a device or a group of devices from each array and replicates data from one to the other synchronously or asynchronously. Generally, the SRDF products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid-state storage device (e.g., a flash-based storage device), should not be construed as a limitation. Other types of commercially available data storage systems, as well as processors and hardware controlling access to these particular devices, may also be included in an embodiment.

In some embodiments, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
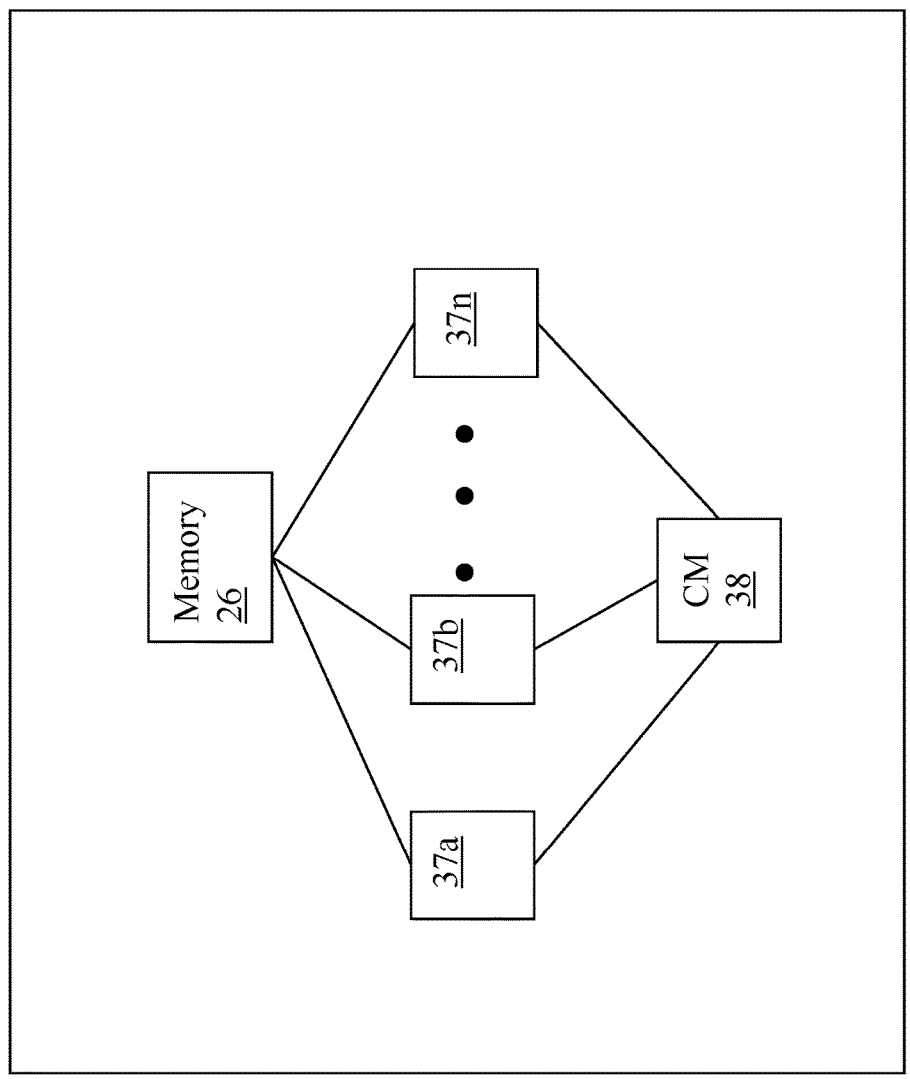
FIG. 2B is a representation of the logical internal communications between the directors and memory, according to at least one embodiment of the data storage system of FIG. 2A.

FIG. 2B is a representation of the logical internal communications between the directors and memory, according to embodiments of the data storage system of FIG. 2A. Other embodiments of such logical internal communications, for example, variations of what is illustrated in FIG. 2B, are possible and are intended to fall within the scope of the invention. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
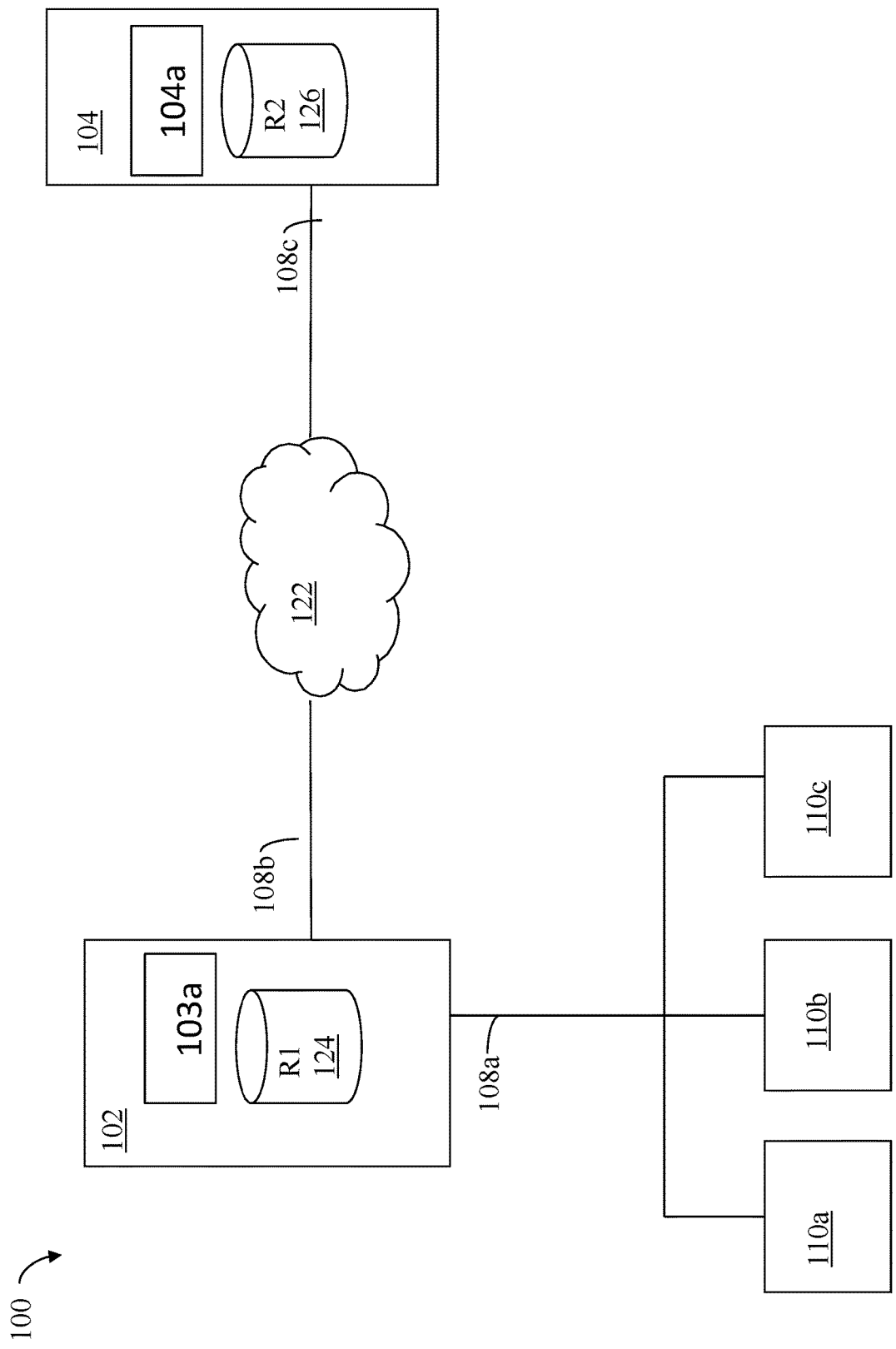
FIGS. 3 and 4 are example representations of components of a system that may be used according to at least one embodiment of the invention.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102 and 104 may include one or more devices. In this example, data storage system 102 includes device R1 124, and data storage system 104 includes device R2 126. Both of the data storage systems 102, 104 may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 110a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF products provided by Dell Inc. Data storage device communication between Symmetrix™ data storage systems using SRDF is described, for example, in U.S. Pat. Nos. 5,742,792, 5,544,347, and 7,054,883, all of which are incorporated by reference herein. With SRDF, a user may denote a first storage device, such as R1, as a master storage device and a second storage device, such as R2, as a slave storage device. Other incarnations of SRDF may provide a peer to peer relationship between the local and remote storage devices. In this example, the host 110a interacts directly with the device R1 of data storage system 102, but any data changes made are automatically provided to the R2 device of data storage system 104 using SRDF. In operation, the host 110a may read and write data using the R1 volume in 102, and SRDF may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF replication functionality may be facilitated with the RAs provided at each of the data storage systems 102 and 104. Performing remote data communications using SRDF over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with SRDF, a single RDF link or path may be between an RA of the system 102 and an RA of the system 104. As described in more detail below, techniques are described for use in transmitting data over an RDF link, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF functionality.

Techniques herein may be used with SRDF, or more generally any RDF, operating in one or more different supported modes. For example, such modes may include SRDF operating in synchronous mode, asynchronous mode, or adaptive copy mode. For example, in connection with SRDF, one of the hosts 110a-c may issue a write to an R1 device in a first data storage system and the data change is propagated to the R2 device in a second data storage system. As discussed in U.S. Pat. No. 5,544,347, SRDF can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system.

In some embodiments performing data replication operating in the asynchronous replication mode, an acknowledgement regarding completion of a host write from one of the hosts 110a-c may be sent to the host from the first data storage system 102 once the write data has been written to the data cache 103a on the system 102. Consistent with discussion elsewhere herein, the write data is subsequently destaged from 103a to physical storage provisioned for the R1 device 124. Additionally, the write data is also transferred to the second data storage system 104 where the write data is then written to the data cache 104a, and acknowledgement is returned from system 104 to 102, and subsequently the write data is destaged from 104a to physical storage provisioned for the R2 device 126.

In some embodiments performing data replication operating in the synchronous replication mode, the first data storage system 102 receives a I/O operation from one of the hosts 110a-c. The system 102 stores the write data in its data cache 103a. Consistent with discussion elsewhere herein, the write data is subsequently destaged from 103a to physical storage provisioned for the R1 device 124. Additionally, the write data is also transferred to the second data storage system 104, where the write data is then written to the data cache 104a, an acknowledgement is returned from system 104 to 102, and subsequently the write data is destaged from 104a to physical storage provisioned for the R2 device 126. The second data storage system 104 sends an acknowledgement to system 102 acknowledging receipt of the write data once the write data has been written to the data cache 104a of the system 104. The first data storage system 102 returns an acknowledgement to the host that sent the I/O operation once the system 102 receives the acknowledgement from the system 104 regarding the write data.

Depending on the physical distance between the data storage systems 102, 104, it may be desirable to operate in a mode such as asynchronous to avoid host timeouts while the host awaits acknowledgement regarding completion of a host I/O.

Described in following paragraphs are techniques that may be used in connection with performing data replication with any suitable mode, such as asynchronous as well as synchronous and other suitable replication modes that may be operable with the particular RDF utilized in an embodiment in accordance with techniques herein.

Each time period for which writes are collected or captured may also be referred to as a cycle or delta set having an associated cycle or sequence number. Thus, writes directed to an R1 device may be collected for cycle 1, cycle 2, and the like, whereby the sequence or cycle number denotes the particular time period in a sequence of successive time periods for which writes are collected. In an embodiment in accordance with techniques herein, dependent write consistency may be provided by processing and preserving all writes to the destination R2 system in ordered sequential numbered sets. In this manner, the writes of each cycle may be applied in a sequential ordering to the R2 device based on the cycle or sequence number associated with each cycle of writes. Dependent write consistency refers to the maintenance of consistent replica data between the R1 source device and R2 destination device.

In one embodiment, writes collected within the same single cycle (e.g., writes having the same sequence or cycle number) may be applied in any order to the R2 device whereby such writes may be characterized as being write order independent. As writes during a time period or cycle are recorded, additional processing may be performed to obtain a final set of write operations actually transmitted from the R1 to the R2 data storage system whereby such writes in the final set are write order independent. For example, write folding may be performed for writes in a single capture cycle whereby if a single portion of data is updated multiple times, only the final or most recent data update is actually included in the final set transmitted to the R2 system. Since consistency is maintained between cycles, if replication stops, processing is performed to ensure that either a fully received cycle of write data is applied to the R2 device, or is otherwise discarded.

In one embodiment, a write may be included in a particular cycle if processing of the write operation has commenced within the time period of that particular cycle.

For each collection or cycle N of write data directed to the R1 device having an associated sequence number, processing may include a data collection or capture phase, a transmit or transmission phase, a receive phase and a restore or apply phase. Generally, writes are collected for a time period or a particular cycle in a capture phase on the R1 system, SRDF/A transfers a cycle of data in the transmit phase from the R1 system to the R2 system, the receive phase on the R2 system receives data from the transmit phase, and the apply or restore phase with respect to a particular cycle refers to applying the cycle of data to the R2 device.

Figure 4:
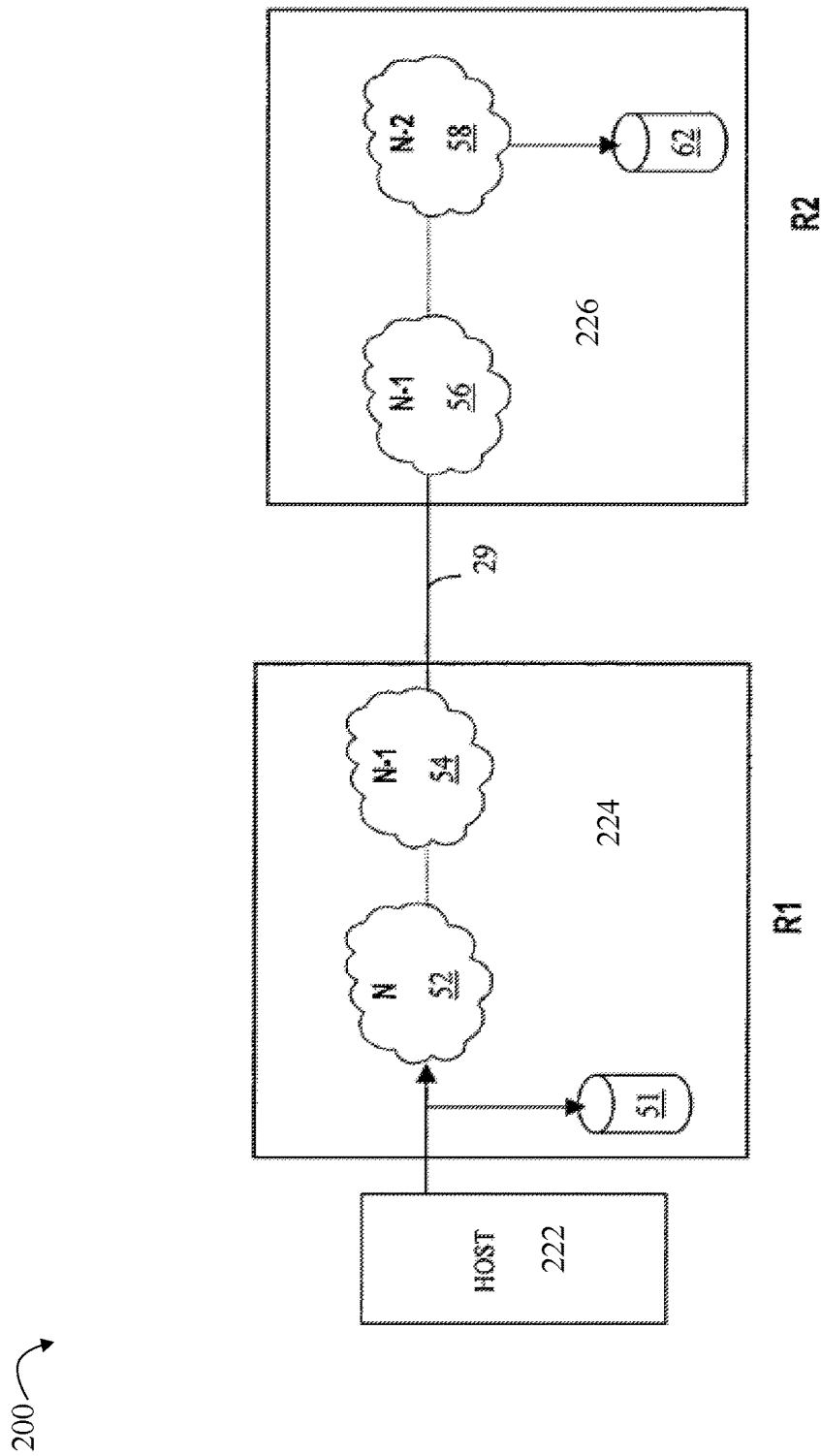

Referring to FIG. 4, a path of data is illustrated from the host 222 to the local R1 storage system 224 and the remote R2 storage system 226. Data written from the host 22 to the local storage system 225 is stored locally, as illustrated by the storage device 51. The data that is written by the host 222 to the local storage system 224 is also maintained by the local storage system 224 in connection with being sent by the local storage system 224 to the remote storage system 226 via the link 29.

In FIG. 4, the writes by the host 222 collected or captured for cycle N are shown as being assigned sequence number N, where N may be greater than zero in a system where the first cycle is denoted by 1. All of the writes performed by the host 22 that are assigned sequence number N are collected in a single cycle or collection of write data 52. The single cycle of write data 52 represents a plurality of separate writes by the host 22 that occur during a single collection cycle or time period.

Generally, the local storage system 224 accumulates writes of one sequence number or collection while transmitting a previously accumulated collection (having the previous sequence number) to the remote storage system 226. Thus, while the local storage system 224 is accumulating writes from the host 222 that are assigned sequence number N, the writes that occurred for the previous sequence number (N−1) are transmitted by the local storage system 224 to the remote storage system 226 via the link 29. A collection or cycle of writes 54 represents writes from the host 22 that were assigned the sequence number N−1 that have not been transmitted yet to the remote storage system 226.

The remote storage system 226 receives the data from the cycle or collection of writes 54 corresponding to writes assigned a sequence number N−1 and constructs a new cycle or collection 56 of host writes having sequence number N−1. The data may be transmitted using appropriate RDF protocol that acknowledges data sent across the link 29. When the remote storage system 226 has received all of the data from the cycle or collection 54, the local storage system 224 sends a commit message to the remote storage system 226 to commit all the data assigned the N−1 sequence number corresponding to the cycle or collection 56. Thus, sending the commit message by the R1 system to the R2 system indicates that all data of the cycle, such as cycle N−1, being transmitted has completed. Generally, once a collection or cycle of writes corresponding to a particular sequence number is committed, that collection or cycle of writes may be written to the logical storage device. This is illustrated in FIG. 4 with a collection 58 corresponding to writes assigned sequence number N−2 (i.e., two before the current sequence number being used in connection with writes by the host 222 to the local storage system 26). In FIG. 4, the collection or cycle 58 is shown as being written to a storage device 62 representing disk storage for the remote R2 device logically paired with R1 device 51 whereby processing is performed to replicate data of R1 device 51 on R2 device 62. Thus, the remote R2 storage system 226 is receiving and accumulating the collection of writes 56 corresponding to sequence number N−1 while the collection of writes 58 corresponding to the previous sequence number (N−2) is being written to disk storage 62 of the remote storage system 226. In some embodiments, the data for the collection 58 is marked for write (but not necessarily written immediately to the physical storage medium or storage device), while the data for the collection 56 is not (e.g. may be stored in cache or other memory buffer).

Thus, in operation, the host 22 writes data to the local storage system 224 that is stored locally in the R2 device 51 and is accumulated in the collection of writes 52. Once all of the data for a particular sequence number has been accumulated (described elsewhere herein), the local storage system 224 increments the sequence number. Data from the collection of writes 54 corresponding to one less than the current sequence number is transferred from the local storage system 224 to the remote storage system 226 via the link 29. The collection of writes 58 corresponds to data for a sequence number that was committed by the local storage system 224 sending a message to the remote storage system 226. Data from the collection 58 is written to the R2 storage device 62.

Note that the writes within a particular one of the collections 52, 54, 56, 58 are not necessarily ordered. However, as described in more detail elsewhere herein, every write for the collection 58 corresponding to sequence number N−2 was begun prior to beginning any of the writes for the collections 54, 56 corresponding to sequence number N−1. In addition, every write for the collections 54, 56 corresponding to sequence number N−1 was begun prior to beginning any of the writes for the collection 52 corresponding to sequence number N. Thus, in the event of a communication failure between the local storage device 24 and the remote storage device 26, the remote storage device 26 may simply finish writing the last committed collection of data (the collection 58 in the example of FIG. 4) and can be assured that the state of the data at the remote storage system 226 is ordered in the sense that the storage device 62 contains all of the writes that were begun prior to a certain point in time and contains no writes that were begun after that point in time. Thus, the R2 device, such as represented by element 62, always contains a point in time copy of R1 and it is possible to reestablish a consistent image from the R2 device.

In some embodiments with reference to FIG. 4, while capture is performed for writes of cycle N (e.g., element 52), the transmit phase (e.g., element 54) and receive phase (e.g., element 56) may be performed with respect to writes of cycle N−1 and the restore or apply phase (e.g., element 58) may be performed with respect to writes of cycle N−2. In such a system, the R1 system may send a commit message (regarding cycle N−1 write data) to the R2 system when the R1 system has completed transmitting all the cycle N−1 write data. The R2 system may send an acknowledgement regarding cycle N−1 to the R1 system when all the cycle N−1 write data has been received at R2 and when R2 has also completed applying the writes of cycle N−2 to the R2 device.

The time that elapses from when a host 222 issues an I/O operation to the local data storage system 224 and when the I/O completes is experienced as I/O latency by the host. Thus, for example with reference to a system using RDF for remote replication operating in synchronous mode, the I/O latency is greater than when operating in asynchronous mode due to the additional time the elapses prior to the local data storage system 224 returning an acknowledgement regarding completion of the write to the host. Generally, I/O latency is an important performance consideration with regard to data replication techniques. Some systems may perform data compression in connection with replication. For example, the I/O (e.g., write) data being transferred from system 224 to system 226 may be compressed prior to transmission over a network connection 29 in order to reduce network bandwidth consumption, to increase overall throughput of the host I/O data and also reduce the I/O latency in connection with performing replication.

In some embodiments of the invention, data deduplication techniques also may be applied to the replication of write data transmitted from the local system 224 to the remote system 226. The data deduplication applied to the I/O data be replicated may be applied to the one or more collections, cycles or sequences of collected write data 52 and 54 transferred from local system 224 to remote system 226. In some embodiments, processing on system 224 may be performed on the collected write data whereby chunks or portions of write data that are redundant are replaced with a reference to a single unique instance or copy of the data before transfer from system 224 to 226 over network connection 29. For example, in some embodiments, every redundant or identical 512-byte block of write data payload may be replaced with a single byte reference to the single unique instance or copy of the data. In some embodiments, to further reduce the size of the I/O data being replicated, deduplication may be performed on sub-blocks of such blocks.

Figure 5:
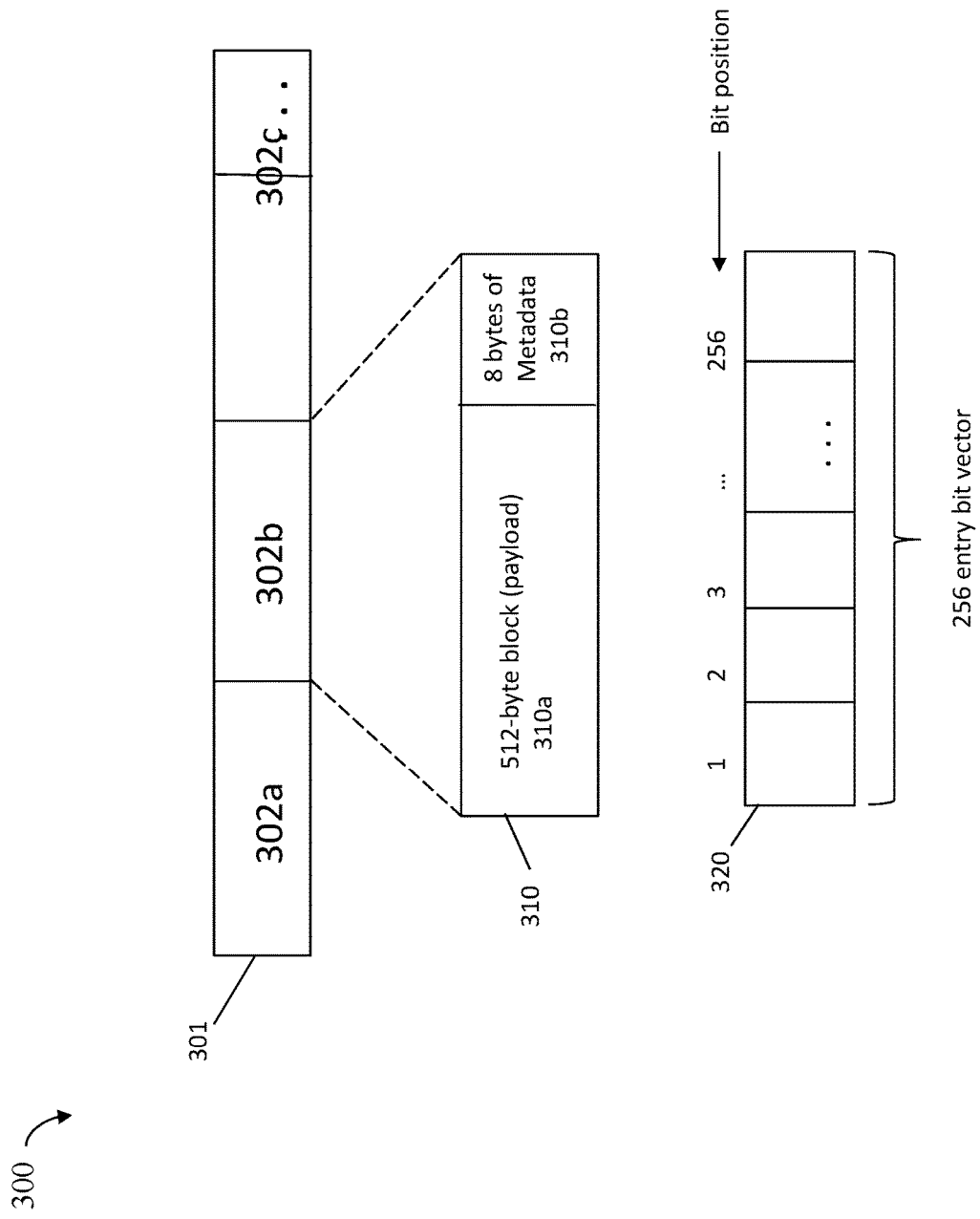
FIG. 5 is an example of I/O data and associated data structures that may be used according to at least one embodiment of the invention.

FIG. 5 is an example 300 of I/O data (e.g., write data) and associated data structures that may be used according to at least one embodiment of the invention. Other embodiments of I/O data and associated data structures, for example, variations of the example 300, are possible and are intended to fall within the scope of the invention. Generally, the I/O data or I/O payload (e.g., write data or write payload) of an I/O operation (e.g., write operation) specified in an I/O request (e.g., write request) specified by a host may be divided (i.e., partitioned) into one or more highest-level data chunks or blocks. Data blocks (i.e., data chunks) are referred to herein as "blocks." In some embodiments, the size of each highest-level block may be the same size, such as 512 bytes of I/O data or payload. Additionally, associated with each highest-level block of I/O data may be metadata used to generally describe that particular block. Such metadata may include, for example, correction or error code information used in connection with validating the particular highest-level block such as in connection with validating and verifying the integrity of the block (e.g., that the block was successfully transferred without corruption or modification from the local system 224 to the remote system 226).

The example 300 illustrates I/O data of a host-requested I/O operation that has been divided into 512-byte highest-level blocks, each associated with its own 8 bytes of metadata. In the example 300, element 302a denotes a first block and its associated block-level metadata, element 302b denotes a second block and its associated block-level metadata, and element 302c denotes a third block and its associated block-level metadata. Generally, the I/O data is divided into a suitable number of highest-level blocks with associated per-block block-level metadata in accordance with the amount or size of the I/O data (e.g., size of the I/O data or data payload). Thus, element 301 may collectively represent the result after dividing a single host I/O operation into multiple 512-byte highest-level blocks and additionally creating and associating per-block metadata with each such block.

Element 310 illustrates in more detail portion 302b although each other portion of the example 300 may be similar to that as illustrated by 310. In 310, the portion 302b includes a 512-byte block or payload 310a and its associated 8 bytes of metadata 310b. Generally, particular sizes are used herein for purposes of illustration. However, such techniques herein may be used in connection with any suitable sizes and are not limited by those provided herein for illustration.

In some embodiments, the maximum data or payload size of any host I/O may be a single track of 128 KB. In such an embodiment, the maximum number of 512-byte blocks of a single I/O operation (maximum number of I/O blocks or payload) is 256. Thus, an embodiment may allocate suitable buffers, other memory, and structures for use with techniques herein to accommodate the maximum number of 256 portions (e.g., 256 512-byte blocks and associated metadata).

The example 300 also illustrates structure 320 for use with techniques herein, which may be referred to herein as a deduplication metadata header. The deduplication metadata header 320 may be a bit vector including a unique bit position for each of the possible 256 blocks for a single I/O operation. The bit positions are numbered 1 through 256, inclusively, as denoted in connection with the structure 320. The deduplication metadata header 320 may include metadata header information for the single host I/O operation. Thus, in addition to each highest-level block (e.g., 310a) including its own block-local metadata (e.g., 310b), additional I/O metadata 320 may be associated collectively with all highest-level blocks and portions 301 of a single host I/O operation having its data transmitted from local system 224 to remote system 226.

The processing described in the following paragraphs may be performed to populate the deduplication metadata header 320. Each of the 512-byte blocks of the single host I/O operation is associated with a different corresponding one of the bit positions. Collectively, 301 denotes the sequence or consecutive positions of the blocks in the host I/O operation. Thus, for example, portion 302a includes the first 512-byte block of the I/O data, portion 302b includes the second 512-byte block of the I/O data, portion 302c includes the third 512-byte block of the I/O data, and so on, for subsequent blocks of the single host I/O operation. The first 512-byte block of 302a has a corresponding bit position 1 in the deduplication metadata header 320. The second 512-byte block of 302b has a corresponding bit position 2 in the deduplication metadata header 320. The third 512-byte block of 302c has a corresponding bit position 3 in the deduplication metadata header 320. Similarly, each subsequent block of a portion in 301 also has a corresponding bit position in deduplication metadata header 320. Based on the foregoing, there is a defined ordering or position of the 512-byte blocks in the I/O data payload where such ordering or position of each of the blocks has a corresponding unique position in the deduplication metadata header 320.

The deduplication metadata header 320 may be populated for use according to embodiments herein as follows. For a highest-level block i having a corresponding bit position i in the deduplication metadata header 320, its corresponding bit position i is set to "1" if the block i or any sub-block thereof has been deduplicated in the final representation of the host I/O to be transmitted from local system 224 to remote system 226; and otherwise the bit position i is set to "0". Put another way, a bit position i for block i is set to:

"0" if the final representation of the host I/O data to be transmitted from local system 224 to remote system 226 includes the actual highest-level block thereby indicating that this is the first unique instance of the highest-level block in the I/O data; or "1" if the final representation of the host I/O data to be transmitted from local system 224 to remote system 226 includes a reference to a unique instance of the highest-level block or any sub-block thereof in the final representation.

For a highest-level block i having a corresponding bit position i in the deduplication metadata header 320 set to "1", it means that the highest-level block i or a sub-block thereof is a redundant or duplicate block D or sub-block S, respectively, and a previous instance of the same block D or sub-block S is located at another position k, whereby block or sub-block position k occurs prior to i in the final representation of the host I/O. For instance, if the deduplication metadata header 320 is as follows:

| Bit position | |
|---|---|
| 1 | 0 |
| 2 | 0 |
| 3 | 0 |
| 4 | 1 |
| 5 | 1 |
| 6 | 1 |
| 7 | 1 |
| 8 | 0 |
| 9 | 0 |
| 10 | 0 | it means the first, second, third, eighth, ninth and tenth highest-level blocks as included in the final host I/O representation to be transmitted are unique; and the fourth, fifth, sixth, and seventh highest-level blocks, or one or more sub-blocks thereof, as included in the final host I/O representation to be transmitted are redundant. In such a case, the final host I/O representation does not include the actual redundant copies of the blocks or sub-blocks for fourth, fifth, sixth, and seventh block instances. Rather, the final host I/O representation includes a reference to the actual single unique block or sub-block instance (e.g., identifies the location in the final representation of the actual single unique block instance). Population and use of deduplication metadata header 320 according at least one embodiment is described in more detail elsewhere herein.

In some embodiments, data reduction techniques described herein are performed on host I/O operations having data to be transferred from the local data storage system 224 to the remote data storage system 226 as part of replication processing performed by RDF. Such processing performed by the local data storage system 224 includes deduplicating redundant blocks to unique instances of blocks and references to the unique blocks. Such processing may be performed by system 224 in connection with egress or outbound processing of I/O data transmitted from system 224 to system 226. In turn, the remote system 226 receiving the deduplicated host I/O operation also performs processing to unwrap or restore the deduplicated I/O data to its original block form on the ingress/inbound processing. Data deduplication is known in the art and generally refers to removing redundant or duplicate data whereby only a single instance of the block is retained with pointers or references used in connection with duplicate or redundant copies (which reference or identify the single instance of the block).

The processing performed on the systems 224 and 226 in some embodiments in accordance with techniques herein is described in more detail below with reference to a particular example. Generally, I/O data of a host I/O operation may be received by the local or R1 data storage system. The I/O operation is an I/O operation directed to the R1 device of a configured R1-R2 device pairing such as illustrated in connection with FIGS. 3 and 4 described elsewhere herein. Processing will be described below that may be performed on the local or R1 data storage system for the I/O data to be transmitted for replication on the corresponding R2 device of the remote or R2 data storage system. Additionally, processing will be described below that may be performed on the R2 or remote data storage system to apply the received I/O data to the R2 device.

Figure 6:
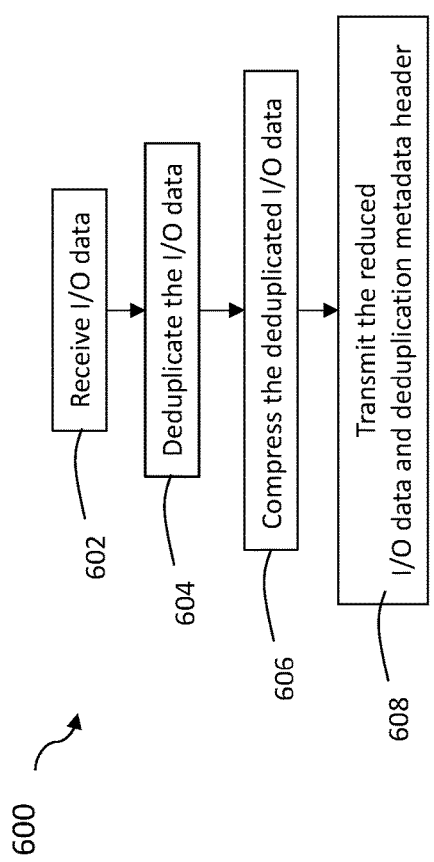
FIG. 6 is a flowchart illustrating an example of a method of performing aspects of data replication according to at least one embodiment of the invention.

FIG. 6 is a flowchart illustrating an example of a method 600 of performing aspects of data replication according to at least one embodiment of the invention. Other embodiments of a method of performing aspects of data replication, for example, variations of the method 600, are possible and are intended to fall within the scope of the invention. Each step of method 600 or portions thereof may be performed by one or more suitable components of the systems described above in relation to FIGS. 1-4.

In a step 602, I/O data may be received, for example, at a primary storage system from a host system. For example, the I/O data may be received as part of a I/O data request from the host. In a step 604, the I/O data may deduplicated, for example, as described in more detail below in relation to method 700 described in relation to FIG. 7. In a step 606, the deduplicated I/O data may be compressed, and in a step 608, the reduced data (i.e., deduplicated and/or compressed) may be transmitted to a secondary storage system. The steps of deduplicating and compressing may be referred to herein a performing data reduction or reduction on the I/O data, or data-reducing or reducing the I/O data. In some embodiments, a deduplication metadata header generated during the deduplication performed in the step 604 may be transmitted along with the reduced I/O data. The reduced I/O data and the deduplication metadata header may be transmitted as part of a replication header.

Figure 7:
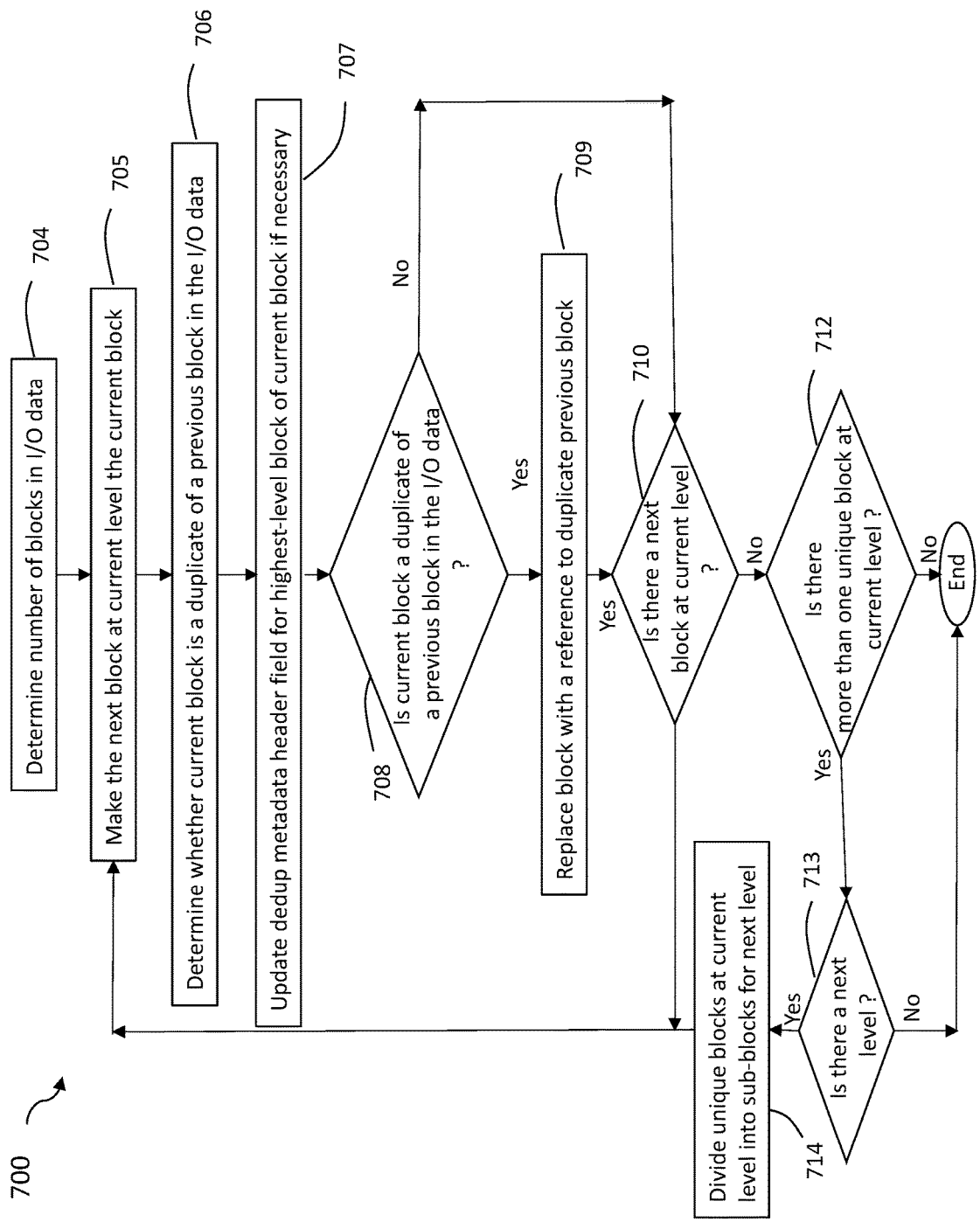
FIG. 7 is a flowchart illustrating an example of a method of performing multi-level deduplication according to at least one embodiment of the invention.

FIG. 7 is a flowchart illustrating an example of a method 700 of performing multi-level deduplication according to at least one embodiment of the invention. Other embodiments of a method of performing multi-level deduplication, for example, variations of the method 700, are possible and are intended to fall within the scope of the invention. Each step of method 700 or portions thereof may be performed by one or more suitable components of the systems described above in relation to FIGS. 1-4.

In a step 704, the number of blocks in the I/O data may be determined. This may be determined, for example, by dividing the I/O data size by a predefined block size (e.g., 512). In a step 705, a next block at the current level may be made the current block, e.g., a variable representing the current block may be set equal to the next level of the current block. On a first pass through steps 705-714 of the method 700, the step 705 may set the current block equal to a second highest-level block in the I/O data. In the context of method 700, both the blocks at the highest level (e.g., 512-byte blocks) and all sub-blocks thereof at lower levels (e.g., 256-byte blocks at a second level, 128-byte blocks at a third level and 64-byte blocks at a fourth level may be referred to as "blocks."

In a step 706, it may be determined whether the current block is a duplicate of a previous block in the I/O block. For example, this may be determined by comparing a fingerprint of the current block to fingerprints of previous blocks at the current deduplication level. A fingerprint of a block may be the result of any function on the block that is guaranteed, or nearly guaranteed (to an acceptable degree), to be unique from the result produced by performing the same function on any data that is not a duplicate, for example, a one-way encrypted hash or a CRC. For example, in some embodiments in which the block size is defined to be 512, a 16-bit CRC-generated value may be compared. The received I/O data may already include a fingerprint (e.g., a 16-bit CRC value) for each block, and on a first pass through the method 700, i.e., at the first level of deduplication, the fingerprint of the current block in the I/O data may be compared to the fingerprint or the first block of the I/O data. On subsequent passes through the method 700 for the first level, the fingerprint of the next block in the I/O data may be compared to the fingerprint of each previous block in the I/O data, until the last block in the I/O data has been compared to all previous blocks of the I/O data.

In a step 707, a field in the deduplication metadata header at a position corresponding to a highest-level block of the current block may be updated to reflect the determination made in the step 706, if necessary. In some cases, the deduplication metadata header field may not need to be updated. For example, the appropriate deduplication metadata header field may have been updated; e.g., a bit set to "1", during a performance of the step 707 at a higher level of deduplication; i.e., for a block for which the current block is a sub-block. For example, at a third level of deduplication on 128-byte blocks, it may be determined that the current 128-byte block is a duplicate of a previous 128-byte block of the I/O data. If either the 256-byte sub-block at the second level of which the 128-byte block is a sub-block, or the 512-byte block at the first (i.e., highest) level of which the 256-byte block is a sub-block were determined to be duplicates during earlier passes through the steps 705-713 of the method 700, then the field in the deduplication metadata header corresponding to the 512-byte block would already have been updated; i.e., set to "1". If neither the 512-byte block or the 256-byte sub-block were determined to be duplicates, then the step 707 for the current 128-byte sub-block would update the field, e.g., by setting it to "1". In some embodiments, all fields of the deduplication metadata header for which there is a corresponding highest-level block in the I/O data may be initialized to "0" and each field updated to "1" if the corresponding highest-level block or a sub-block thereof is determined to have a duplicate block.

In a step 708, it may be ascertained whether it was determined in the step 706 that the current block is a duplicate of a previous block in the I/O data. If so, then in a step 709, which may be performed concurrently, at least in part, or before performance of the step 707, the current block may be replaced within the I/O data with a reference to the duplicate previous block in the I/O data. For example, the current block may be replaced with a deduplication block header 800 described in relation to FIG. 8.

Figure 8:
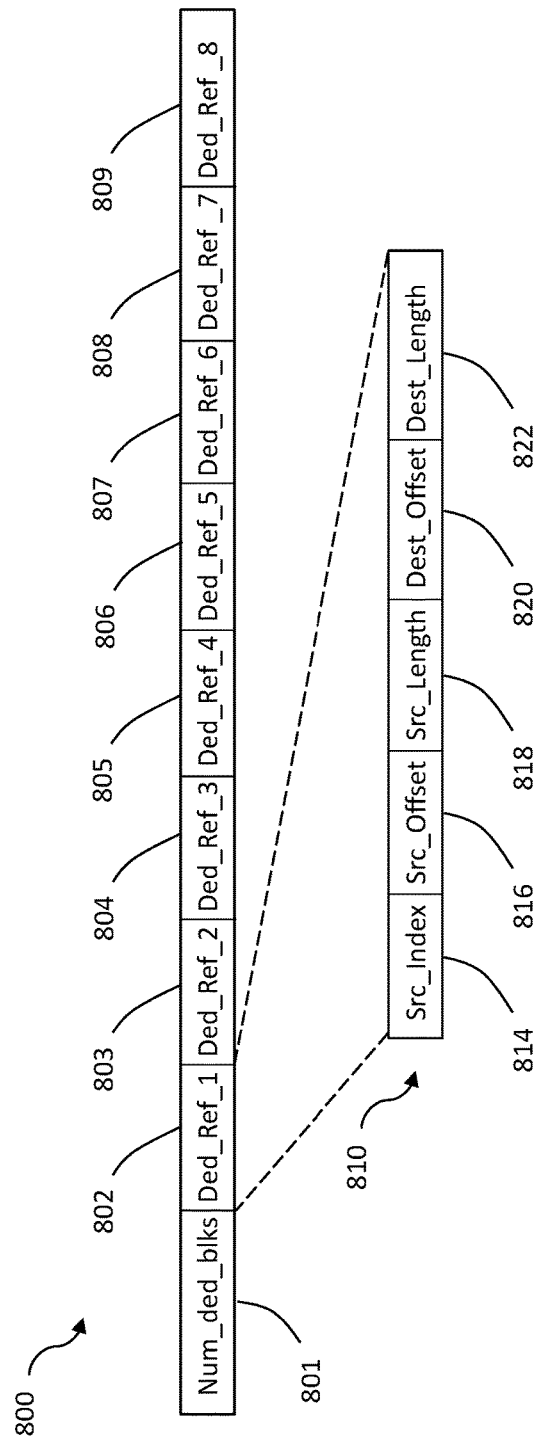
FIG. 8 is an example of a deduplication block header according to at least one embodiment of the invention.

FIG. 8 is an example of a deduplication block header 800 according to at least one embodiment of the invention. Other embodiments of a deduplication block header, for example, variations of the deduplication block header 800, are possible and are intended to fall within the scope of the invention. The deduplication block header 800 may include a plurality of deduplication reference fields, each deduplication reference field corresponding to a deduplicated block (e.g., highest-level block or sub-block thereof) of a highest-level block. The number of deduplication reference fields may be: the number of blocks for a highest-level block, including the highest-level block itself and its sub-blocks, that currently are duplicates (i.e., a dynamic number of deduplication reference fields); or could potentially be duplicates (i.e., a static number of deduplication reference fields). For example, if there are four levels of blocks for which duplication processing is being performed, i.e., 512 bytes, 256 bytes, 128 bytes and 64 bytes, then there could be up to eight blocks for which there are duplicates. That is, in a most extreme case, given a highest-level 512-byte block, there are no duplicates at the first three levels, and all of the at the 64-byte fourth level blocks are determined to be duplicates of previous 64-byte blocks in the I/O data. Accordingly, for the foregoing example, the deduplication block header 800 may have up to eight deduplication reference fields 802-809. In some embodiments, the deduplication block header, or portions thereof, may be implemented as an array data structure that comprises an array of deduplication header reference entries.

The deduplication block header 800 may include a dedup number field 801 holding a value representing the number of blocks that have been deduplicated for the highest-level block represented by the deduplication block header 800. In an embodiment in which the number of the deduplication reference fields is dynamic, the number in the field 801 will equal the number of deduplication reference fields in the deduplication block header 800. The dedup number field 801 may be updated one or more times during performance of the method 700, including possibly one or more times at each level other than the highest level, for each sub-portion compared.

Each of the deduplication fields 802-809 may have a data structure 810, including, but not necessarily limited to, a source index field 814, a source offset field 816, a source length field 818, a destination offset field 820 and a destination length field 822. The source index field 814 may reference a position of the highest-level block in the I/O data that is the block or contains the sub-block that the block represented by the deduplication reference field (i.e., the duplicate block) duplicates. For example, if the duplicate block duplicates the first highest-level block in the I/O data, or a sub-block thereof, the value in the source index field may be set equal to "1". The source offset field 816 may reference a position within the highest-level block at which the block (e.g., sub-block) duplicated by the duplicate block begins. For example, if the duplicate block duplicates the first highest-level block itself, the value in the source offset field may be set equal to "0", as there is no offset because the first high-level block is the beginning of the I/O data. As another example, for highest-level block sizes of 512 bytes, and second-level block sizes of 256 bytes, if the duplicate block is a 256-byte block and duplicates a second 256 sub-block of the first (or any) highest-level block, the value in the source offset field may be set equal to 256, as the second 256-byte sub-block of a highest-level block will begin 256 bytes from the beginning of the highest-level block referenced in the source index field 814.

The source length field 818 may hold a value specifying a length of the duplicated block, which is equal to the size of the duplicate block (e.g., 512, 256, 128 or 64 in the four-level embodiment described herein). The destination offset field 820 may reference a position within the highest-level block that contains or is the duplicate block (e.g., sub-block) at which the duplicate block begins. Using the four-level (512, 256, 128 or 64) example again, if the duplicate block is a fifth 64-byte sub-block of the fourth level, the source offset is 320 (bytes). The destination length field 822 may hold a value specifying a length of the duplicate block, e.g., 64 (bytes) in the four-level example.

The size of the fields 801, 814, 816, 818, 820 and 822 may be configured to be large enough to accommodate the number of levels and the size of the blocks at each level. In embodiments in which the maximum number of highest-level blocks is 256, and there are four levels of blocks of sizes 512 bytes, 256 bytes, 128 bytes and 64 bytes, the sizes in bytes of fields 801, 814, 816, 818, 820 and 822 may be 1, 1, 2, 2, 2 and 2, respectively. Thus, for a maximum of 8 deduplication reference fields, the size of the DHB may be 1+8*(1+2+2+2+2)=for a total of 73 bytes.

Returning to the method 700, after performance of the steps 709, or if it determined in the step 708 that the current block is not a duplicate of a previous block in the I/O data, in the step 710 it may be determined whether there is a next block at the current level. If it is determined that there is a next block at the current level, the method repeats the steps 705-710, and if it determined that there is not a next block at the current level (e.g., there are 13 blocks at the current level and the steps 705-710 were just performed on the 13$^{th}$ block), then in a step 712 it may be determined whether, after having performed the steps 705-709 at the current level, there is more than one unique (i.e., non-duplicate) block at the current level, as the first block will always be unique; i.e., after having performed the steps 705-709 on the current level. This may be determined, for example, by tracking the number of blocks deduplicated at the current level and comparing it to the total number of blocks at the current level, which may be determined and stored before the first iteration of the steps 705-710 for the current level. If all blocks except the first block at the current level are a duplicate, then the method 700 may end, as there is no data left to deduplicate. If at least one block other than the first block at the current level is not a duplicate, then in a step 712 it may be determined whether there is a next level; e.g., a next lower level. If there is not a next level, the method 700 may end. If there is a next level, then, in a step 714, the unique blocks of the current level may be divided into sub-blocks, i.e., the blocks for the next level. For example, 256-byte sub-blocks may be divided into 128-byte sub-blocks.

An example execution of the method 700 will now be described in more detail in relation to FIGS. 9-12C, for illustrative purposes.

Figure 9:
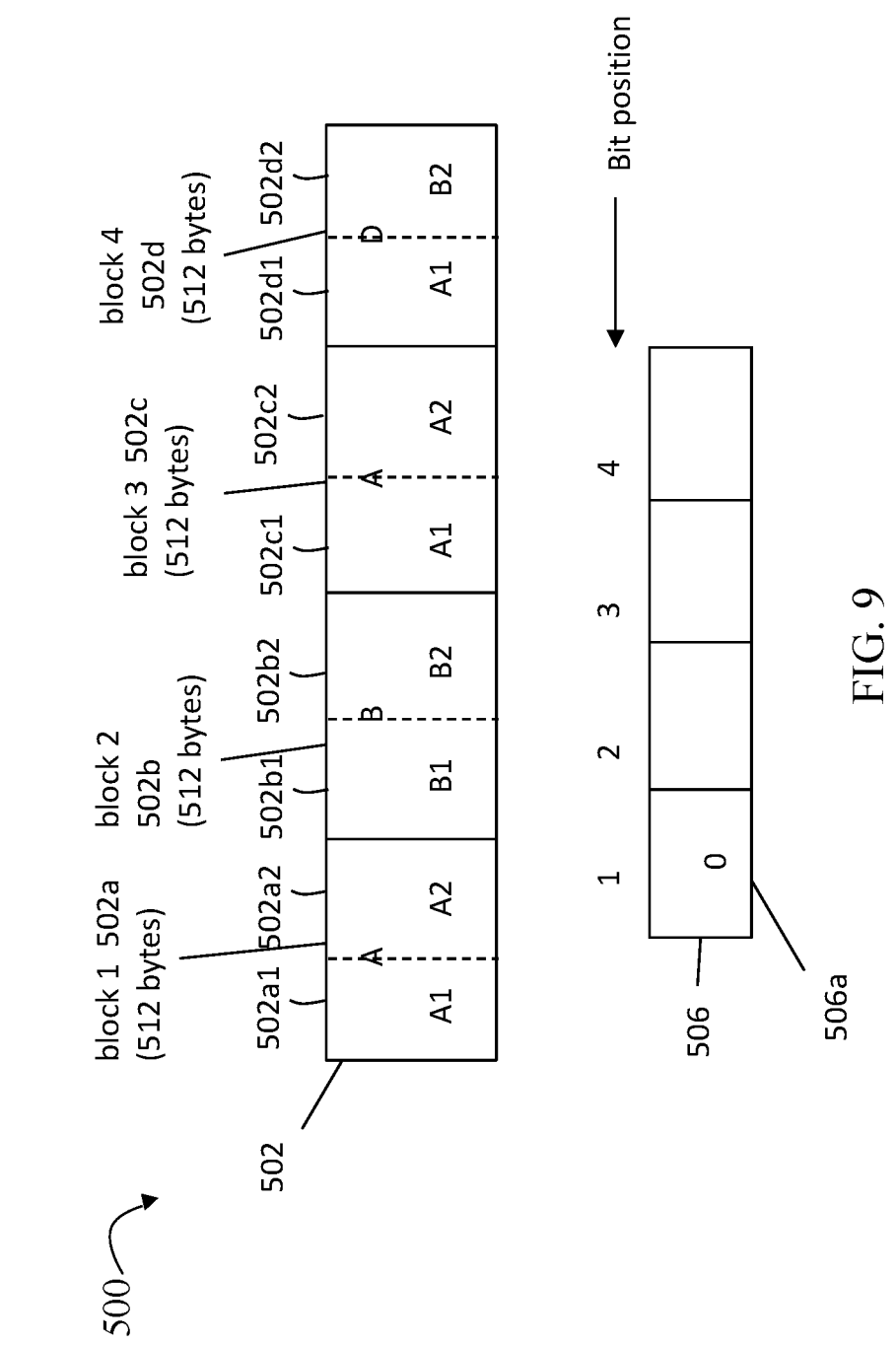
FIGS. 9-12C illustrate examples of performing multi-level deduplication according to at least one embodiment of the invention.

Referring to FIG. 9, shown is an example of I/O data of a single host I/O operation in an embodiment in accordance with techniques herein. Element 502 represents the I/O data or payload of the single host I/O operation to be written to an R1-R2 RDF-configured device pair such as illustrated in connection with FIGS. 3 and 4 and described elsewhere herein. In this example, the size of the I/O data or payload illustrated by I/O data 502 is 2 KB and the number of 512-byte blocks for 2 KB I/O operation is 4 (four). On the local or R1 data storage system, the I/O data 502 to be transmitted to the remote or R2 data storage system may be divided into 4 blocks 502a-502d, each block being 512 bytes in size, where each block 502a-502d may be divided into data sub-blocks 502a1, 502a2, 502b1, 502b2, 502c1, 502c2, 502d1, and 502d2, respectively, as illustrated in FIG. 9, each sub-block being 256 bytes in size. In this example: the first and third blocks (502a, 502c) are the same as denoted by "A"; the first sub-block of the first block (502a1) and the first sub-block of the fourth block (502d1) are the same as denoted by "A1"; and the second sub-block of the second block (502b2) and the second sub-block of the fourth block (502d2) are the same as denoted by "B1."

During a first iteration of the steps 705-710 of the method 700, the deduplication metadata header is updated as illustrated by element 506, whereby field (e.g., bit vector entry) 1 506a corresponding to block 502a is set to "0" (zero) to denote the first block 1 502a is unique; i.e., not a duplicate of another preceding block in the I/O data. It should be appreciated that the first block in the I/O data is always unique in the sense that there is no preceding block of which it can be a duplicate.

Figure 10:
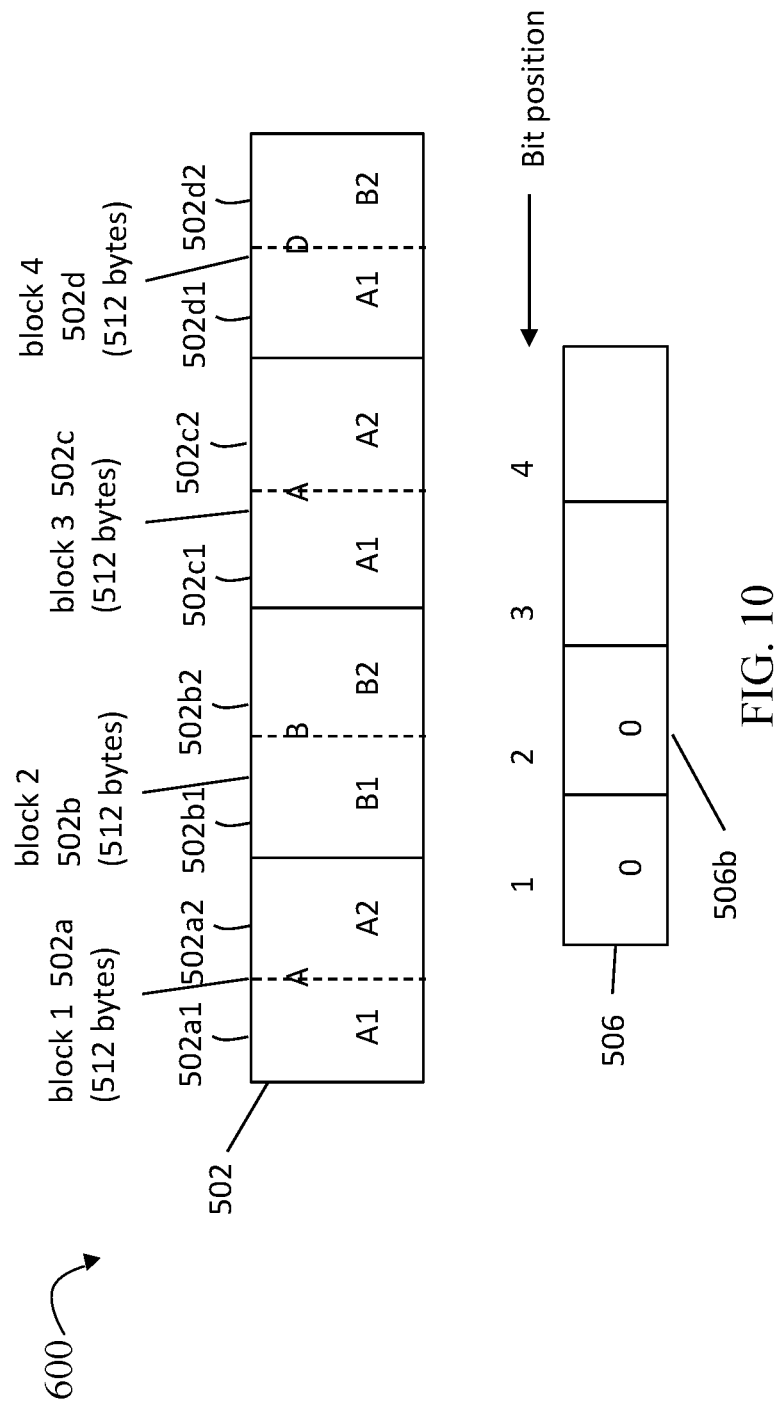

Reference is made to the example 600 of FIG. 10 in connection with a second iteration of the steps 705-710 in which the second block 502b is processed. The second block 502b="B" is compared to the first block 502a="A". As 502b is not a duplicate of 502a ("B" does not="A"), the deduplication metadata header is updated as illustrated by element 506, whereby deduplication metadata header field 2 506b corresponding to block 502b is initialized to "0" (zero) to denote the second block 2 502b is unique and not a duplicate of another preceding block in the I/O data.

Figure 11A:
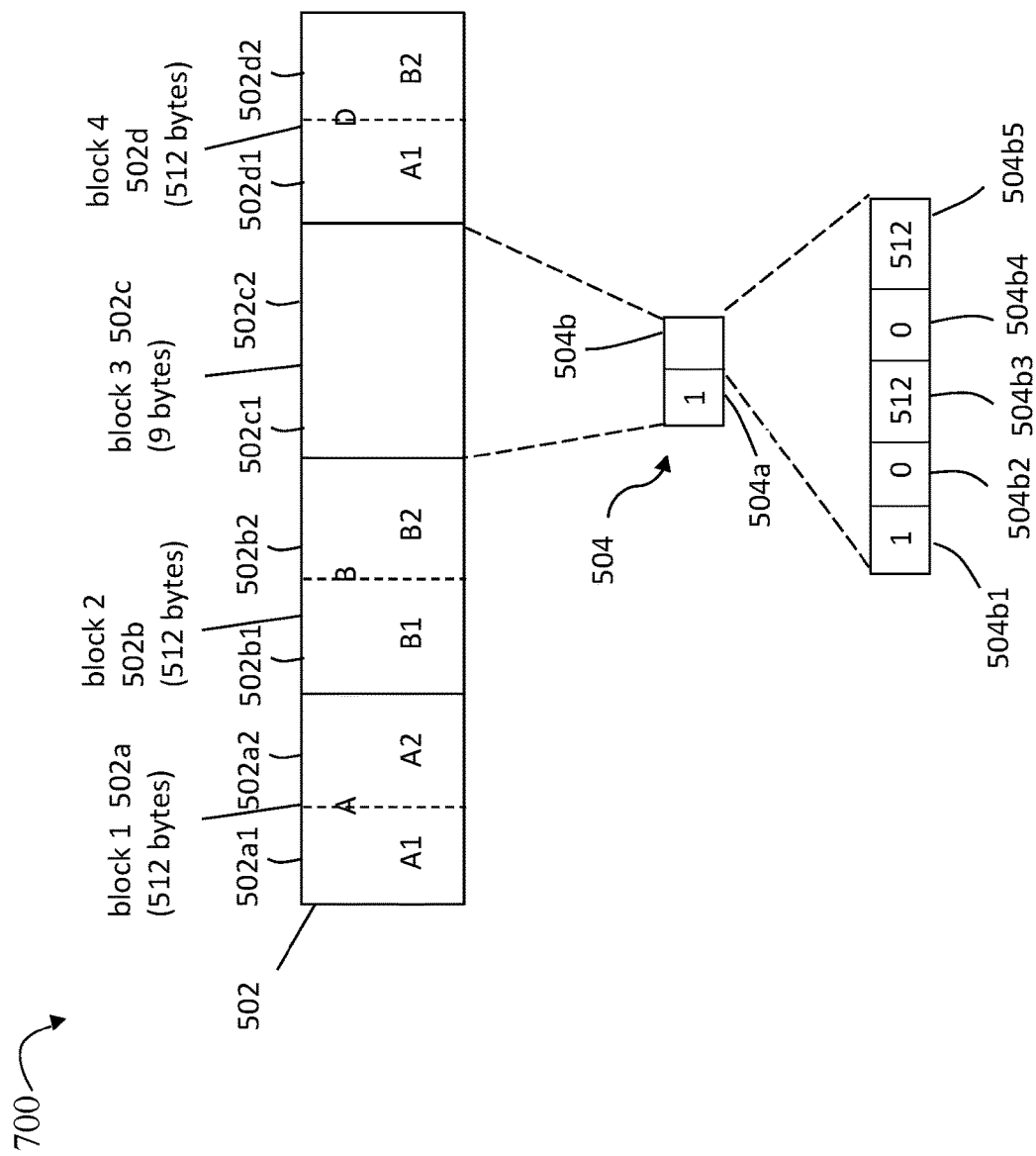
Figure 11B:
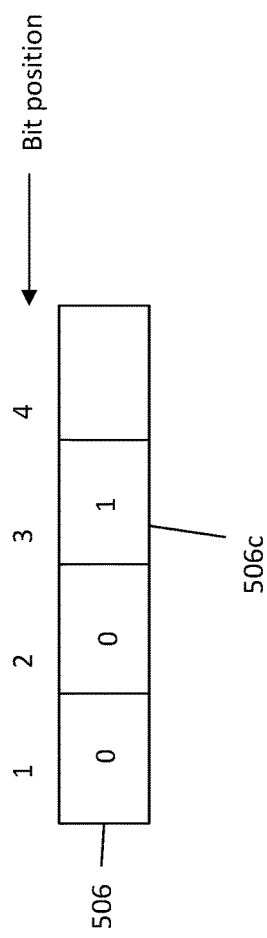

Reference is made to the example 700 of FIG. 11A in connection with a third iteration of the steps 705-710 in which the third block 502c is processed. The third block 502c="A" is compared to the first block 502a="A", and it is determined that 502c is a duplicate of 502a. The value "A" in the third block is then replaced with the deduplication block header 504. The dedup number field 504a has a value="1" indicating that one block, 502c, has been deduplicated. The source index field 504b1 of the duplicate reference field 504b has a value="1" indicating that the highest-level block is the first highest-level block, 502a. The source offset field 504b2 has a value="0", as there is no offset because the first high-level block 502a is the beginning of the I/O data. The source length field 504b3 has a value="512" indicating that the length of duplicated block 502a is 512 bytes. The destination offset field 504b4 has a value="0" indicating that the beginning position of block 502c is offset zero bytes from the beginning of its highest-level block, which is block 502c itself. The destination length field 504b5 has a value="512" indicating that the length of block 502c is 512 blocks. Additionally, as illustrated in FIG. 11B, the deduplication metadata header is updated as illustrated by element 506, whereby deduplication metadata header field 3 506c corresponding to block 502c is set to"1" (one) to denote the third block 3 502c is not unique; i.e., is a duplicate of another preceding block in the I/O data.

Figure 11C:
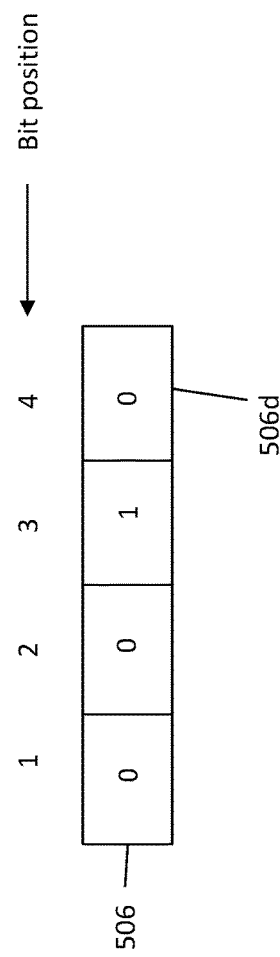
Figure 12B:
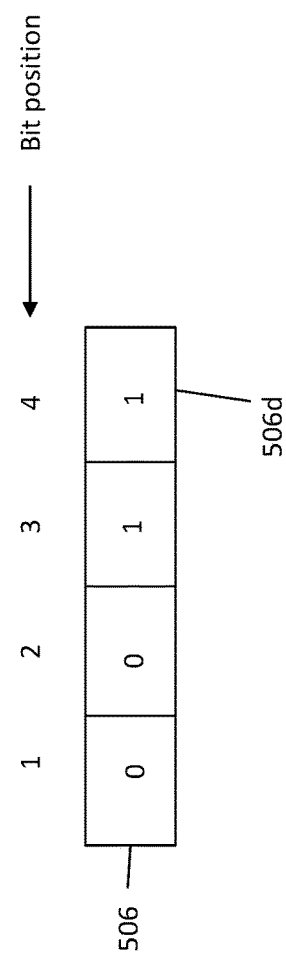

During a fourth iteration through the steps 705-710, it is determined that the fourth block 502d="D" is a unique block, and I/O data 502 remains unchanged. Additionally, as illustrated in FIG. 12B, the deduplication metadata header is updated as illustrated by element 506, whereby deduplication metadata header field 4 506d corresponding to block 502d is set to"1" (one) to denote the fourth highest-level block 4 502d is not unique, but rather is a duplicate of another preceding block in the I/O data. In the step 710, it is determined that there is not a next block at the current level, and in the step 712 it is determined that there is at least one block, 502b and 502d, other than the first block 502a that are not duplicate blocks. Accordingly, in the step 714, blocks 502a, 502b and 502d are divided into 256-byte blocks 502*a*1, 502*a*2, 502*b*1, 502*b*2, 502*d*1 and 502*d*2, respectively. During the first three passes through the steps 705-710 for blocks 502*a*2, 502*b*1 and 502*b*2 of the current level, it is determined that these three blocks have unique data "A2", "B1" and "B2" respectively, and the I/O data 502 remains unchanged since the third iteration. Additionally, as illustrated in FIG. 11C, the deduplication metadata header is updated as illustrated by element 506, whereby deduplication metadata header field 4 506*d* corresponding to block 502*d* is set to "0" (zero) to denote the fourth highest-level block 4 502*d* is unique; i.e., is not a duplicate of another preceding block in the I/O data.

Figure 12A:
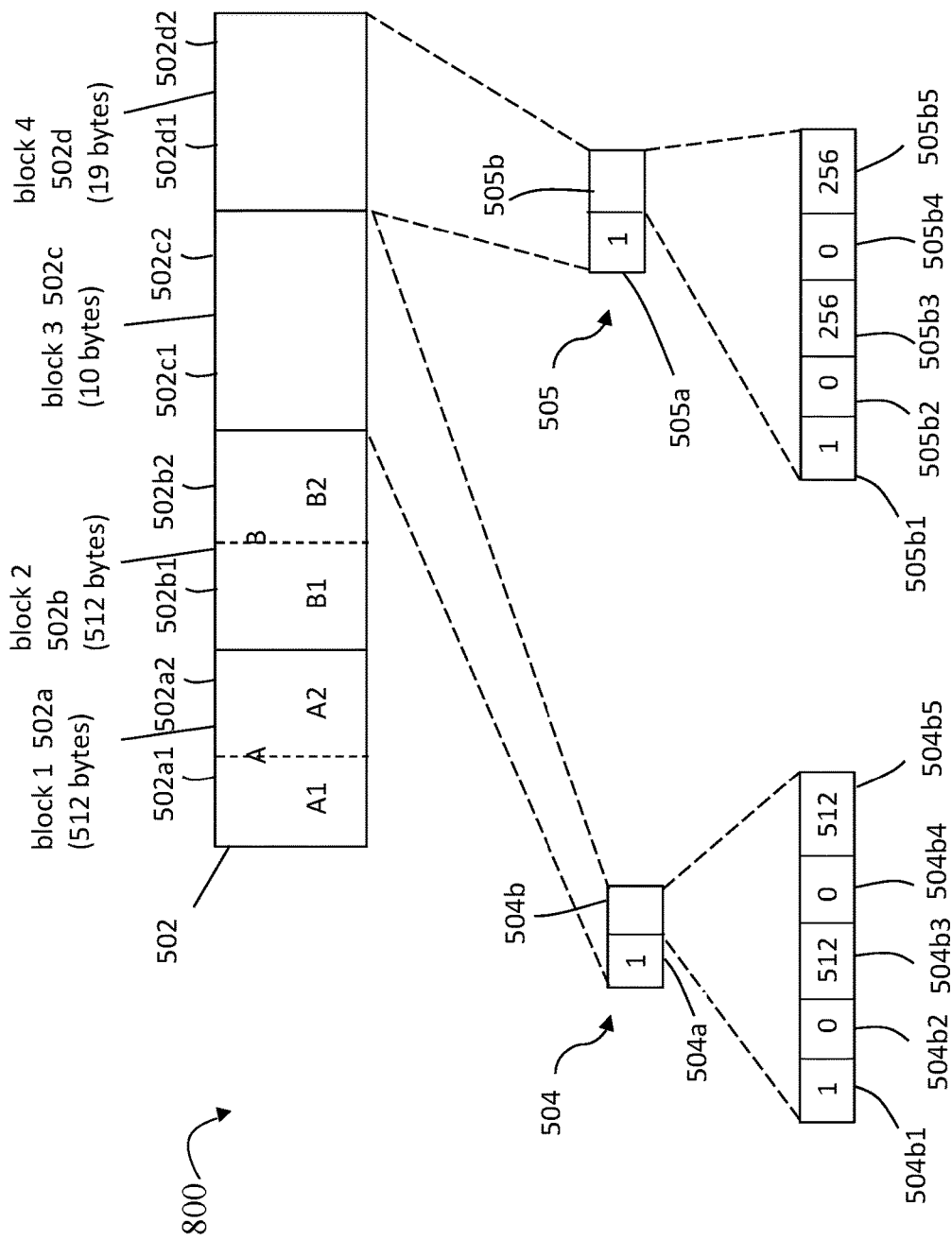

Reference is made to the example 800 of FIG. 12A in connection with the eighth iteration of the steps 705-710 (the fourth pass for the current 256-byte level) in which the block 502*d*1="A1" is processed. During the eighth iteration, it is determined that 502*d*1 is a duplicate of 502*a*1. The value "A1" in the block 502*d*1 is then replaced with the deduplication block header 505. The dedup number field 505*a* holds a value="1" indicating that one block, 502*d*1, has been deduplicated for the current highest-level block 502*d*. The source index field 505*b*1 of the deduplication reference field 505*b* has a value="1" indicating that the highest-level block is the first highest-level block, 502*a*. The source offset field 505*b*2 has a value="0", as there is no offset because duplicated block 502*a*1 is the first sub-block of highest-level block 502*a*. The source length field 505*b*3 has a value="256" indicating that the length of the duplicated block 502*a*1 is 256 bytes. The destination offset field 505*b*4 has a value="0" indicating that the beginning position of block 502*d*1 is offset zero bytes from the beginning of its highest-level block, 502*d*. The source length field 505*b*5 has a value="256" indicating that the length of block 502*d*1 is 256 blocks.

Figure 12C:
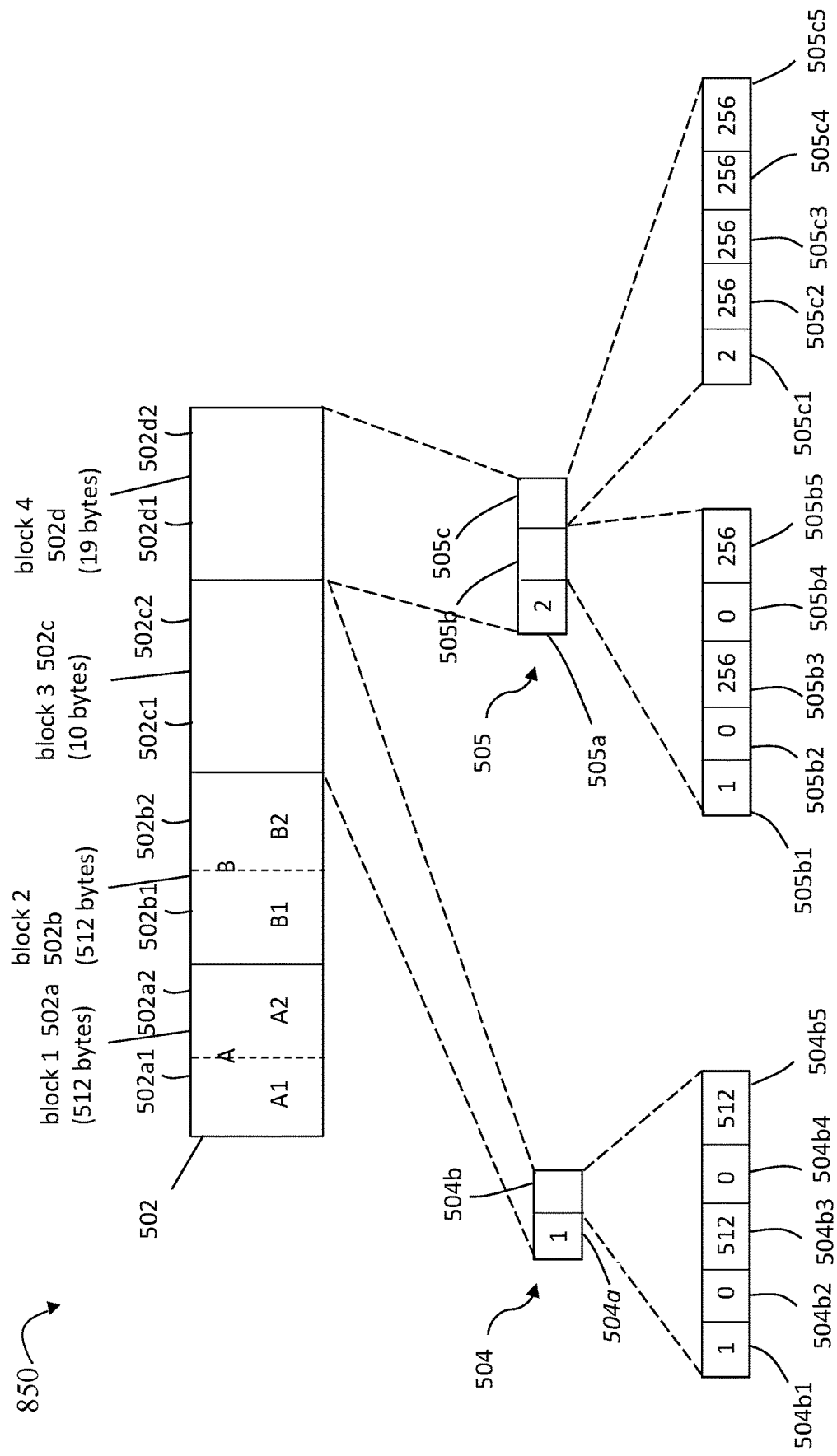

Reference is made to the example 850 of FIG. 12C in connection with the ninth iteration of the steps 705-710 (the fifth pass for the current 256-byte level) in which the block 502*d*2="B2" is processed. During the ninth iteration, it is determined that 502*d*2 is a duplicate of 502*b*2. The deduplication block header 505 is then updated. The dedup number field 505*a* is modified to a value="2" indicating that two blocks, 502*d*1 and 502*d*2, have been deduplicated for the current highest-level block 502*d*. The source index field 505*c*1 of the deduplication reference field 505*c* has a value="2" indicating that the highest-level block is the second highest-level block, 502*b*. The source offset field 505*c*2 has a value="256" because duplicated block 502*b*2 is the second 256-byte sub-block of highest-level block 502*b*. The source length field 505*c*3 has a value="256" indicating that the length of the duplicated block 502*b*2 is 256 bytes. The destination offset field 505*c*4 has a value="256" indicating that the beginning position of block 502*d*2 is offset 256 bytes from the beginning of its highest-level block, 502*d*. The source length field 505*c*5 has a value="256" indicating that the length of block 502*d*2 is 256 blocks. The deduplication metadata header field 4 506*d* element 506 of the deduplication metadata header in FIG. 12B does not need to be updated because it was already set="1" during the eighth iteration for the block 502*d*1.

Performance of the step 710 during the ninth iteration results in a determination that there are no more blocks at the 256-byte level, and in the step 710 it is determined that there is more than one unique block at the 256-byte level, i.e., 502*a*2, 502*b*1 and 502*b*2, in response to which 502*a*1, 502*a*2, 502*b*1 and 502*b*2 are each divided into 128-byte blocks, several iterations of the steps 705-710 are performed at the third level (i.e., the 128-byte level). No duplicate blocks are determined at the 128-byte level, after which all of the unique 128-byte blocks are divided into 64-byte blocks, and the steps 705-710 are performed at the fourth level (i.e., the 64-byte level). No duplicate blocks are determined at the 64-byte level.

In the example 850, element 502 denotes the final representation of the I/O data (i.e., the deduplicated I/O data) whereby each redundant or duplicate block has been replaced with a reference to the unique block instance occurring in a prior block of the I/O data 502. Additionally, the final resulting deduplication metadata header 506 of FIG. 12C identifies corresponding blocks of the deduplicated I/O data that are unique block instances (e.g., deduplication metadata header field="0") and that include at least one are duplicate block (e.g., deduplication metadata header field="1") and thereby include one or more references (i.e., in the deduplication block header) to actual block instances in the deduplicated I/O data. In this example, the size of the original I/O data was 4*512=2048 bytes, and size of the resulting deduplicated I/O data 502 is 2*512+10+19=1053 bytes, representing a 49% reduction in size. It should be appreciated that this example used a dynamic number of deduplication reference fields (504*b*, 505*b* and 505*c*). If this same example used a static number of deduplication reference fields, the total number for each deduplication block header would be 8, resulting in each deduplication block header having a size of 73 bytes, which result in deduplicated I/O data 502 having a size of 2*512+2*73=1170, which would represent a 43% reduction in size. With either a static or dynamic number of deduplication reference fields, compressing the deduplicated I/O data 502 to produce reduced I/O data, for example, by performance of the step 606, will result in a further reduction in size. The reduced I/O data then may be transmitted along with the final deduplication metadata header 506 from FIG. 12C and an original size information to the secondary storage system, e.g., R2.

The secondary storage system then may restore the original I/O data from the transmitted reduced I/O data, for example, in accordance with some embodiments that will now be described.

Figure 13:
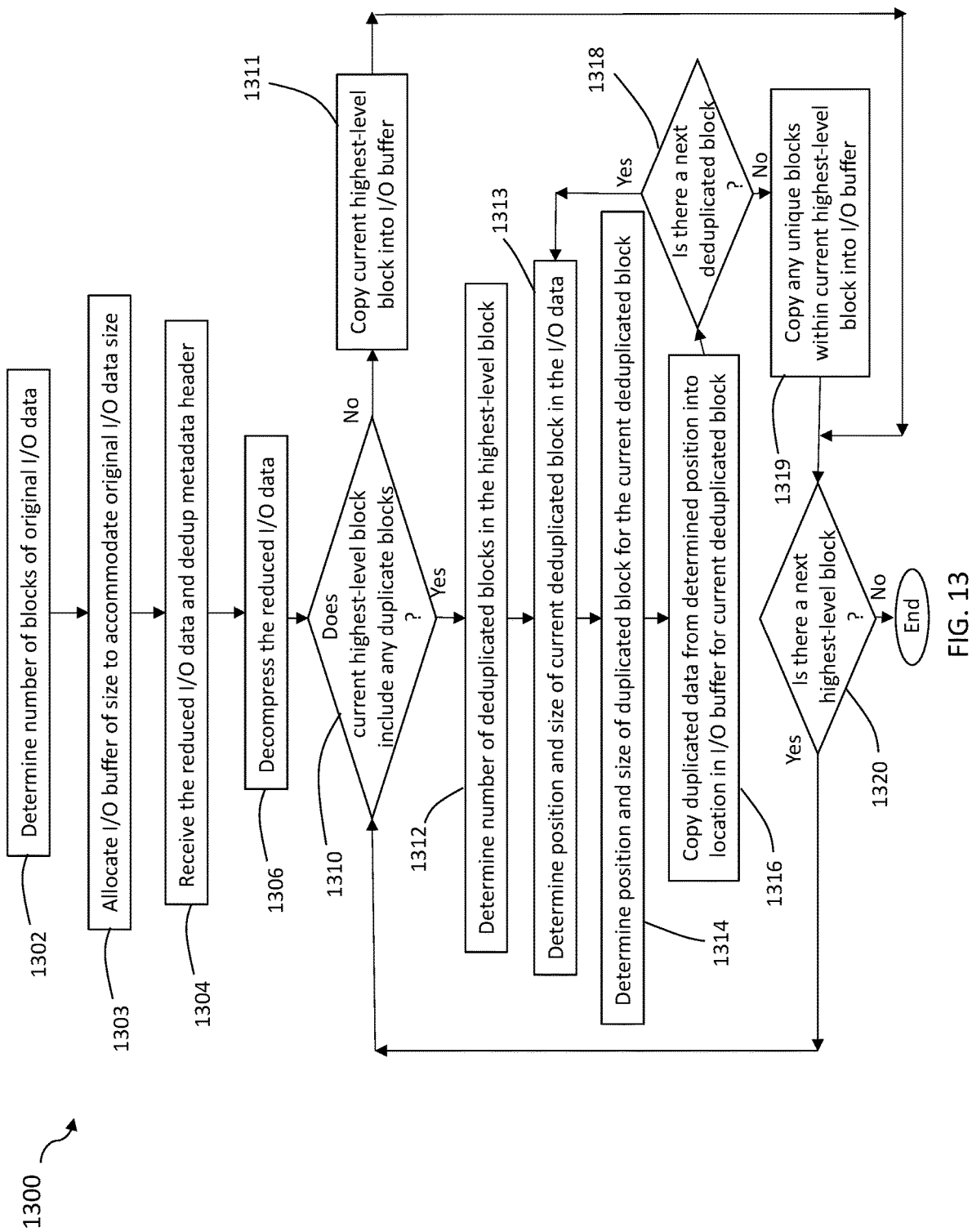
FIG. 13 is a flowchart illustrating an example of a method of restoring original I/O data from data-reduced I/O data according to at least one embodiment of the invention.

FIG. 13 is a flowchart illustrating an example of a method 1300 of restoring original I/O data from data-reduced I/O data according to at least one embodiment of the invention. Other embodiments of a method 1300 of restoring original I/O data from data-reduced I/O data, for example, variations of the method 1300, are possible and are intended to fall within the scope of the invention. The method 1300 may be performed at a secondary storage system (e.g., R2) on reduced I/O data being replicated from a primary storage system. The primary and secondary storage systems may be implemented using a storage system or components thereof described above in relation to FIGS. 1-4.

In a step 1302, a number of blocks of original I/O data may be determined. For example, original size information may be provided along with the reduced I/O data, for example, as part of a replication header. The original size (e.g. 24 KB) may be divided by the predefined highest-level block size (e.g., 512) to determine the number of blocks (e.g., 48). In a step 1303, an I/O data buffer of size large enough to accommodate the original I/O data size (e.g., 24 KB) may be allocated.

In a step 1304, the reduced I/O data and the deduplication metadata header may be received, for example, along with the original size information, where the deduplication metadata header may be received in a replication header. In a step 1306, the reduced I/O data may be decompressed to produce deduplicated I/O data, after which the original I/O data may be restored by iterative performance of steps 1310-1320 on the deduplicated I/O data. In a step 1310, it may be determined whether the current highest-level block includes any duplicate blocks. The duplicate blocks may include the highest-level block itself or sub-blocks thereof, i.e., at lower deduplication levels. On a first pass through steps 1310-1320, the current highest-level block is the first highest-level block in the deduplicated I/O data. Determining whether the current highest-level block includes any duplicate blocks may include inspecting the field (e.g., bit) in the deduplication metadata header corresponding to the highest-level block. For example, a value of "1" in this field may indicate that a duplicate block is included in the highest-level block, and a value of "0" may indicate that no duplicate blocks are included.

If it is determined that the current highest-level block does not include a duplicate block, i.e., it is a unique block, then, in a step 1311, the current highest-level block may be copied as-is into the I/O buffer. If it is determined that the current highest-level block includes at least one deduplicated block, then, in the step 1312, the number of duplicate blocks in the current highest-level block may be determined. The number of deduplicated blocks may be determined from the value in the dedup number field 801 of the deduplication block header 800 included in the deduplicated I/O data, e.g., at the position of the current highest-level block. Although not shown in FIG. 13, a deduplication block counter may be set to the determined number of deduplicated blocks. Steps 1313-1318 may be performed iteratively, once for each deduplicated block in the current highest-level block.

In the step 1313, for the current deduplicated block, a position and size of the duplicated block in the deduplicated I/O data may be determined, for example, from the already known beginning position of the current highest-level block in combination with the destination offset field 820 and destination length field 822 of a deduplication reference field for the current deduplicated block. For a first pass through steps 1313-1318, the current deduplicated block is the first deduplicated block for the current highest-level, for example, as specified by a first deduplication reference field of the deduplication block header 800.

In a step 1314, for the current deduplicated block, a position and size of the duplicated block in the deduplicated I/O data may be determined, for example, from the source index field 814, the source offset field 816 and the source length field 818 of the deduplication reference field for the current deduplicated block. In a step 1316, the duplicated data may be copied from the duplicated block into the location in the I/O buffer for the deduplicated block. Although not shown in FIG. 13, after performance of the step 1316, the deduplicated block counter may be decremented by one.

In a step 1318, it may be determined whether there is a next deduplicated block for the current highest-level block, for example by determining whether the deduplication block counter is not equal to zero. If there is a next deduplicated block, the method 1300 may return to the step 1313, and steps 1313-1318 may be repeated for the next deduplicated block (now the current deduplicated block). If there is not a next duplicated block, then, in the step 1319, any unique blocks within the current highest-level block may be copied to their appropriate location(s) in the I/O buffer. In a step 1320, it may be determined whether there is a next highest-level block. If there is not a next highest-level block, then the method may end. If it is determined that there is a next highest-level block, for example, by reference to the deduplication metadata header. If so, then steps 1310-1320 may be repeated for the next highest-level block; otherwise method 1300 may end. After completion of the method 1300, the original I/O data, now restored in the I/O buffer, may be further processed.

It should be appreciated that one or more steps of the method 1300 may be performed in an order other than that shown in FIG. 13, and that, although the steps are illustrated as being performed in series, one or more steps or parts thereof may be performed concurrently. For example, the performance of steps 1302 and 1303 may be performed concurrently with or before performance of the steps 1304 and 1306. Further, the steps 1312 and 1313 or parts thereof may be performed concurrently or in a different order than shown.

An example of a performance of the method 1300 will now be described, continuing the example described above in relation to FIGS. 9-12C, which may be performed by a secondary storage system, e.g., R2 or remote system, receiving the transmitted reduced I/O data 502 from FIG. 12.

Referring to the example 900 of FIG. 14, from knowledge of the 512-byte block size and original size information transmitted with the reduced I/O data, it may be determined from performance of the step 1302 that there are four 512-byte blocks. A final buffer 904 of the example 900 having a size of 2 KB may be allocated by performance of the step 1303. Reduced I/O data 502 may be received and decompressed in the steps 1304 and 1306, and four iterations of the steps 1310-1320 performed, one iteration for each of blocks 502a, 502b, 502c and 502d. In the first iteration, for the block 502a, in the step 1310 it may be determined from the field 906a of the deduplication metadata header 906 that the block 502a is entirely unique (i.e., does not include any deduplicated blocks), and in the step 1311, the data "A" from 502a may be copied into the block 904a of the final buffer 904.

Referring to the example 950 of FIG. 15, in the second iteration of the steps 1310-1320, for the block 502b, in the step 1310 it may be determined from the field 906b of deduplication metadata header 906 that the block 502b is entirely unique (i.e., does not include any deduplicated blocks), and in the step 1311, the data "B" from the block 502b may be copied into the block 904b of the final buffer 904.

Referring to the example 960 of FIG. 16, in the third iteration of the steps 1310-1320, for the block 502c, in the step 1310 it may be determined from the field 906c of the deduplication metadata header 906 that the block 502c includes a duplicate block. In the step 1312, it may be determined from the dedup number field 504a of the deduplication block header 504 that there is one deduplicated block in the highest-level block 502c. In the step 1313, the starting position and length (512 bytes) of the duplicate block 502c may be determined from the destination offset field 504b4 and the destination length field 504b5, and in the step 1314, the identity, starting position and length of the deduplicated block 502a may be determined from the source index field 504b1, source offset field 504b2 and source length field 504b3. In the step 1316, the data="A" in the block 502a is copied into the block 904c of final buffer 904, which corresponds to the block 502c of the I/O block data.

Referring to the example 960 of FIG. 17, in the fourth iteration of the steps 1310-1320, for the block 502d, in the step 1310 it may be determined from the field 906d of the deduplication metadata header 906 that the block 502d includes a duplicate block. In the step 1312, it may be determined from the dedup number field 505a of the deduplication block header 504 that there are two deduplicated blocks in the highest-level block 502*d*, after which two passes through the steps 1313-1318 may be performed, one for each of the deduplicate blocks 502*d*1 and 502*d*2. During the first pass, in the step 1313, the starting position and length (256 bytes) of the duplicate block 502*d*1 may be determined from the destination offset field 505*b*4 and the destination length field 505*b*5, and in the step 1314, the identity, starting position and length of the deduplicated block 502*a*1 may be determined from the source index field 505*b*1, source offset field 505*b*2 and source length field 505*b*3. In the step 1316, the data="A1" in the block 502*a*1 is copied into the block 904*d*1 of final buffer 904, which corresponds to the block 502*d*1 of the I/O block data. During the second pass, in the step 1313, the starting position and length (256 bytes) of the duplicate block 502*d*2 may be determined from the destination offset field 505*c*4 and the destination length field 505*c*5, and in the step 1314, the identity, starting position and length of the deduplicated block 502*b*2 may be determined from the source index field 505*c*1, source offset field 505*c*2 and source length field 505*c*3. In the step 1316, the data="B2" in the block 502*b*2 is copied into the block 904*d*2 of the final buffer 904, which corresponds to the block 502*d*2 of the I/O block data.

During the performance of the step 1318 during the second pass of the fourth iteration, it may be determined that there is not a next deduplicated block for the highest-level block 502*d*. As there are no unique blocks within the highest-level block 502*d*, no unique blocks are copied in the step 1319. In the step 1320, it may be determined, e.g., by inspection of the deduplication metadata header 906 or a count set after the number of blocks was determined in the step 1302, that there is not a next-level block, and the method 1300 may end.

Various embodiments discussed herein may be combined with each other in appropriate combinations in connection with the system and techniques described herein. Additionally, in some instances, the order of steps in the flowcharts, flow diagrams and/or described flow processing may be modified, where appropriate. Further, various aspects of the system and techniques described herein may be implemented using software, hardware, a combination of software and hardware and/or other computer-implemented modules or devices having the described features and performing the described functions. Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system and techniques described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of processing I/O data comprised of a plurality of blocks of data, the method comprising:

receiving an I/O request including the I/O data, wherein the I/O data is an I/O data payload of the I/O request, and wherein each block has a position in the I/O data payload;
determining that at least a first block of the plurality of blocks is not a duplicate of any other block of the plurality of blocks;
dividing the at least first block into a plurality of sub-blocks;
determining that at a first sub-block of the plurality of sub-blocks is a duplicate of a second sub-block of the plurality of sub-blocks; and
replacing the at least first sub-block with a reference to the second sub-block to produce deduplicated I/O data, wherein the reference is relative to a position of the second sub-block within the I/O data payload.

2. A method according to claim 1, further comprising:
determining that at least a second block of the plurality of blocks is a duplicate of a third block of the plurality of blocks; and
replacing the at least second block with a reference to the third block.

3. A method according to claim 1, further comprising:
determining that at least a second block of the plurality of blocks is a duplicate of a third block of the plurality of blocks; and
refraining from dividing the at least second block into a plurality of sub-blocks or determining whether any sub-blocks of the plurality of sub-blocks is a duplicate of any other sub-block of the plurality of sub-blocks.

4. A method according to claim 1, wherein determining that the at least first block of the plurality of blocks is not a duplicate includes determining that two or more of the plurality of blocks is not a duplicate of any other block of the plurality of blocks, and
wherein dividing the at least first block into the plurality of sub-blocks includes dividing the two or more blocks into the plurality of sub-blocks.

5. A method according to claim 1, further comprising:
creating a first data structure corresponding to the I/O data, the first data structure having a number of fields, each field representing a respective one of the blocks of the I/O data and indicating whether the respective block or any sub-block thereof has been replaced with a reference to a duplicate block or duplicate sub-block, respectively.

6. A method according to claim 5, the method further comprising:
replicating the I/O data to a second storage system, including transmitting the deduplicated I/O data to the second storage system:
at the second storage system, restoring the I/O data from the deduplicated I/O data using the first data structure and one or more references to duplicate blocks and/or duplicate sub-blocks in the deduplicated I/O data.

7. A method according to claim 1, wherein the I/O data is part of an I/O request received at a first storage system, the method further comprising;
replicating the I/O data to a second storage system, including transmitting the deduplicated I/O data to the second storage system.

8. A method according to claim 7, further comprising:
compressing the deduplicated I/O data prior to transmitting the deduplicated I/O data to the second storage system such that transmitting the deduplicated I/O data includes transmitting the compressed deduplicated I/O data.

9. A method according to claim 1, further comprising:
creating the reference to the second sub-block, wherein the reference includes an indication of a position of the second sub-block within the I/O data.

10. A method according to claim 1, further comprising:
creating the reference to the second sub-block, wherein the reference includes a count of a number of sub-blocks within the first sub-block for which a duplicate sub-block within the I/O data is determined.

11. A data storage system in which I/O data received from a host is comprised of a plurality of blocks of data, the data storage system comprising:
one or more processors; and
a memory comprising code stored thereon that, when executed, performs a method comprising:
receiving an I/O request including the I/O data at the data storage system, wherein the I/O data is an I/O data payload of the I/O request, and wherein each block has a position in the I/O data payload;
determining that at least a first block of the plurality of blocks is not a duplicate of any other block of the plurality of blocks;
dividing the at least first block into a plurality of sub-blocks;
determining that at a first sub-block of the plurality of sub-blocks is a duplicate of a second sub-block of the plurality of sub-blocks; and
replacing the at least first sub-block in the I/O data with a reference to the second sub-block to produce deduplicated I/O data, wherein the reference is relative to a position of the second sub-block within the I/O data payload.

12. A data storage system according to claim 11, wherein the method further comprises:
determining that at least a second block of the plurality of blocks is a duplicate of a third block of the plurality of blocks; and
replacing the at least second block with a reference to the third block.

13. A data storage system according to claim 11, wherein the method further comprises:
determining that at least a second block of the plurality of blocks is a duplicate of a third block of the plurality of blocks; and
refraining from dividing the at least second block into a plurality of sub-blocks or determining whether any sub-blocks of the plurality of sub-blocks is a duplicate of any other sub-block of the plurality of sub-blocks.

14. A data storage system according to claim 11, wherein the method further comprises:
creating a first data structure corresponding to the I/O data, the first data structure having a number of fields, each field representing a respective one of the blocks of the I/O data and indicating whether the respective block or any sub-block thereof has been replaced with a reference to a duplicate block or duplicate sub-block, respectively.

15. A data storage system according to claim 14, and wherein the method further comprises:
replicating the I/O data to a second storage system, including transmitting the deduplicated I/O data to the second storage system:
at the second storage system, restoring the I/O data from the deduplicated I/O data using the first data structure and one or more references to duplicate blocks and/or duplicate sub-blocks in the deduplicated I/O data.

16. A non-transitory computer-readable medium having software stored thereon for a data storage system in which I/O data received from a host is comprised of a plurality of blocks of data, the software comprising:
executable code that receives an I/O request including the I/O data, wherein the I/O data is an I/O data payload of the I/O request, and wherein each block has a position in the I/O data payload;
executable code that determines that at least a first block of the plurality of blocks is not a duplicate of any other block of the plurality of blocks;
executable code that divides the at least first block into a plurality of sub-blocks;
executable code that determines that at a first sub-block of the plurality of sub-blocks is a duplicate of a second sub-block of the plurality of sub-blocks; and
executable code that replaces the at least first sub-block in the I/O data with a reference to the second sub-block to produce deduplicated I/O data, wherein the reference is relative to a position of the second sub-block within the I/O data payload.

17. A non-transitory computer-readable medium according to claim 16, wherein the software further comprises:
executable code that determines that at least a second block of the plurality of blocks is a duplicate of a third block of the plurality of blocks; and
executable code that replaces the at least second block with a reference to the third block.

18. A non-transitory computer-readable medium according to claim 16, wherein the software further comprises:
executable code that determines that at least a second block of the plurality of blocks is a duplicate of a third block of the plurality of blocks; and
executable code that refrains from dividing the at least second block into a plurality of sub-blocks or determining whether any sub-blocks of the plurality of sub-blocks is a duplicate of any other sub-block of the plurality of sub-blocks.

19. A non-transitory computer-readable medium according to claim 16, wherein the software further comprises:
executable code that creates a first data structure corresponding to the I/O data, the first data structure having a number of fields, each field representing a respective one of the blocks of the I/O data and indicating whether the respective block or any sub-block thereof has been replaced with a reference to a duplicate block or duplicate sub-block, respectively.

20. A non-transitory computer-readable medium according to claim 19, wherein the software further comprises:
executable code that replicates the I/O data to a second storage system, including transmitting the deduplicated I/O data to the second storage system such that, at the second storage system, the I/O data is restored from the deduplicated I/O data using the first data structure and one or more references to duplicate blocks and/or duplicate sub-blocks in the deduplicated I/O data.

* * * * *